United States Patent [19]

Ueno

[11] Patent Number: 5,710,771
[45] Date of Patent: Jan. 20, 1998

[54] MULTICHANNEL COMMUNICATION SYSTEM

[75] Inventor: Tomoyuki Ueno, Kawasaki, Japan

[73] Assignee: Fujitsu Limited, Kanagawa, Japan

[21] Appl. No.: 557,599

[22] Filed: Nov. 14, 1995

[30] Foreign Application Priority Data

Mar. 20, 1995 [JP] Japan .................................. 7-061363

[51] Int. Cl.[6] ...................................................... H04J 4/00
[52] U.S. Cl. ........................... 370/436; 370/478; 370/496
[58] Field of Search ..................................... 370/330, 329,
370/336, 337, 363, 344, 345, 347, 436,
442, 478, 480, 496, 498, 522, 524, 527,
528, 529, 535, 537

[56] References Cited

U.S. PATENT DOCUMENTS

| | | | |
|---|---|---|---|
| 3,872,255 | 3/1975 | Nance et al. | 370/436 |
| 5,081,704 | 1/1992 | Umeda et al. | 370/330 |

*Primary Examiner*—Wellington Chin
*Assistant Examiner*—Huy D. Vu
*Attorney, Agent, or Firm*—Helfgott & Karas, P.C.

[57] ABSTRACT

A multichannel communication system has a transmitter for frequency-division-multiplexing and transmitting signals in a plurality of channels, and a receiver for selectively receiving the signal in one of the channels. The multichannel communication system prevents additional information from being interrupted in reception due to a channel change, for thereby reliably transmitting such additional information. The transmitter has a control information multiplexing unit for time-division-multiplexing main information in each of the channels with control information common to the channels at the same timing, and a transmitting unit for frequency-division-multiplexing and transmitting the main information in each of the channels which has been time-division-multiplexed with the control information by the control information multiplexing unit. The receiver has an inhibit signal generating unit for generating a channel change inhibit signal in timed relationship to the multiplexing of the control information, and an extracting unit extracting unit responsive to a channel change signal indicative of one of the channels to be received, for extracting the signal in the channel which is indicated by the channel change signal from frequency-division-multiplexed signals transmitted from the transmitting unit if a channel change inhibit signal is not transmitted from the inhibit signal generating means.

13 Claims, 24 Drawing Sheets

PRIOR ART

PRIOR ART

MULTICHANNEL COMMUNICATION SYSTEM

BACKGROUND OF THE INVENTION

(1) Field of the Invention

The present invention relates to a multichannel communication system including a transmitter for frequency-division-multiplexing and transmitting signals in a plurality of channels and a receiver for selectively receiving a signal in a particular one of the channels, and more particularly, to an FDM (frequency-division multiplex) or FDMA (frequency-division multiplex access) multichannel communication system in which a transmitter performs added-value services including timer-based program receptions, reception limitations, etc. for a receiver.

(2) Description of the Related Art

As information to be transmitted becomes more and more diverse, recent communication or broadcasting systems are required to have multichannel transmission paths and transmit additional information to perform timer-based program receptions, reception limitations for main information, etc., e.g., control information separate from main information such as video and audio information if the broadcasting system is a television broadcasting system.

The additional information contains information representing a reception permission, such as of a reception limitation service. If this information is not received by a receiver, the receiver is prevented from receiving the main information until it received the information next time. To prevent such a reception failure from happening, it is particularly strictly required for the additional information to be received reliably by the receiver.

To allow the additional information to be reliably transmitted, there have been proposed processes of adding error-correcting codes for preventing information errors on the transmission lines, effecting majority decisions by transmitting the same information in succession, and detecting information errors to request retransmission of information.

A multichannel communication or broadcasting system which multiplexes and transmits main and additional information is also required to solve the problem that the reception of additional information is interrupted the instant channels are changed, and the transmitted additional information is not received during the channel change.

One conventional multichannel communication or broadcasting system is arranged as shown in FIGS. 22 through 24, for example, of the accompanying drawings.

As shown in FIG. 22, a transmitting station 100 is supplied with three types of main information (1)~(3) in three channels 1~3 to be transmitted, and additional information in another channel (channel SV) which is common to the three types of main information (1)~(3). The additional information contains data relative to a reception limitation.

The transmitting station 100 has main information transmission processors 101, 102, 103 for receiving the three types of main information (1)~(3), respectively, and modulators 104~106 for modulating the three types of main information (1)~(3) respectively with carriers having respective different frequencies $f_1$~$f_3$. The transmitting station 100 also includes a transmitting station controller 107 and an additional information transmission processor 108 for receiving the additional information, and a modulator 109 for modulating the additional information with a carrier having a frequency $f_{sv}$ which is different from the frequencies $f_1$~$f_3$. The modulators 104~109 send modulated output signals to a transmission signal combiner 110, which combines the signals and transmits the combined signals to a receiving station 120 shown in FIG. 23. The signals combined by the transmission signal combiner 110 have their frequencies arranged as shown in FIG. 24.

As shown in FIG. 23, the receiving station 120 has a received signal distributor 121 for separating the three types of main information (1)~(3) which have been transmitted with the carriers having the respective frequencies $f_1$~$f_3$ and the additional information which has been transmitted with the carrier having the frequency $f_{sv}$, and sends the separated main and additional information to a main information receiver 122 and an additional information receiver 123, respectively. In the main information receiver 122, a tuner 122a extracts the signal transmitted in the channel that is indicated by a reception channel selector 124, from one of the three channels, and a demodulator 122b demodulates the main information represented by the signal. In the additional information receiver 123, a tuner 123a extracts the signal transmitted in the channel SV, and a demodulator 123b demodulates the additional information represented by the signal. An additional information reception processor 126 picks up the data relative to the reception limitation from the additional information from the demodulator 123b, and sends the data to a receiving station controller 127. Based on the supplied data, the receiving station controller 127 enables a main information reception processor 125 to control the outputting of the mail information from the receiving station 120.

Since the additional information is transmitted with the dedicated carrier having the frequency $f_{sv}$, the additional information can reliably be received without interruptions when the tuner 122a of the main information receiver 122 changes channels under the control of the reception channel selector 124.

The conventional system, however, is disadvantageous in that it has to occupy the frequency $f_{sv}$ for the transmission of the additional information regardless of whether the amount of additional information is large or small, and that the receiving station 120 must have two receivers for receiving both main and additional information.

SUMMARY OF THE INVENTION

It is therefore an object of the present invention to provide a multichannel communication system capable of avoiding reception interruptions of additional information upon changing of channels and hence of reliably transmitting additional information, without the need for a channel dedicated for the transmission of additional information.

To achieve the above object, there is provided in accordance with the present invention a multichannel communication system comprising a transmitter for frequency-division-multiplexing signals in a plurality of channels and transmitting the frequency-division-multiplexed signals, and a receiver for selectively receiving the signal in one of the channels. The transmitter comprises control information multiplexing means for time-division-multiplexing main information in each of the channels with control information common to the channels at the same timing, and transmitting means for frequency-division-multiplexing and transmitting the mail information in each of the channels which has been time-division-multiplexed with the control information by the control information multiplexing means. The receiver comprises inhibit signal generating means for generating a channel change inhibit signal in timed relationship to the multiplexing of the control information, and extracting means responsive to a channel change signal indicative of one of the channels to be received, for extracting the signal in the one of the channels which is indicated by the channel change signal from frequency-division-multiplexed signals transmitted from the transmitting means if a channel change inhibit signal is not transmitted from the inhibit signal generating means.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

The principles of the present invention will be described below with reference to FIG. 1.

Figure 1:
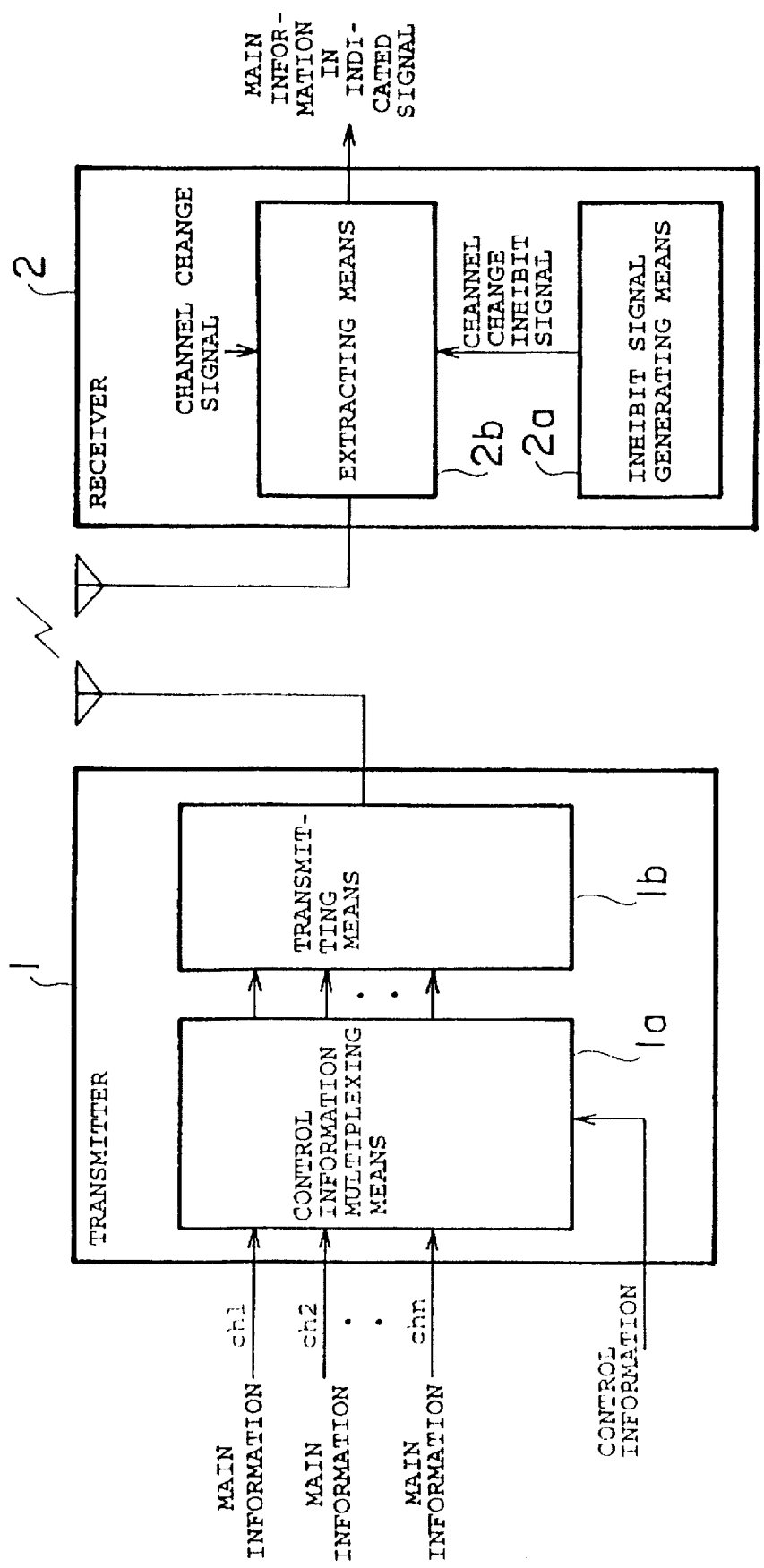
FIG. 1 is a block diagram illustrative of the principles of the present invention.

As shown in FIG. 1, a transmitter 1 has a control information multiplexing means 1a for multiplexing each of a plurality of items of main information in respective channels with control information common to the channels at the same timing, and a transmitting means 1b for frequency-division-multiplexing and transmitting the items of main information that have been multiplexed with the control information by the control information multiplexing means 1a. A receiver 2 has an inhibit signal generating means 2a for generating a channel change inhibit signal in timed relationship to the multiplexing of the control information, and an extracting means 2b responsive to a channel change signal indicative of a new channel to be received, for extracting the signal in the channel indicated by the channel change signal from the frequency-division-multiplexed signal transmitted from the transmitting means 1b in the absence of any channel change inhibit signal from the inhibit signal generating means 2a.

Figure 2:
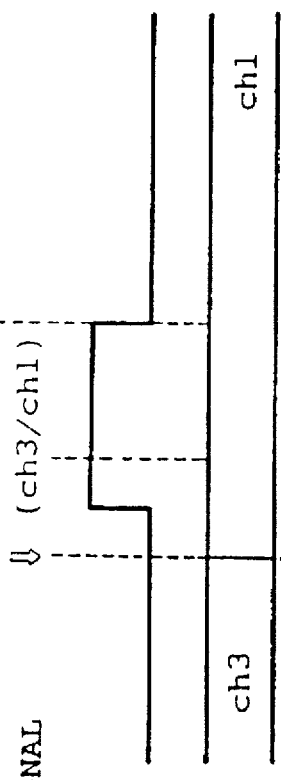
FIG. 2 is a timing chart illustrative of a former half of the operation of the present invention.
Figure 3:
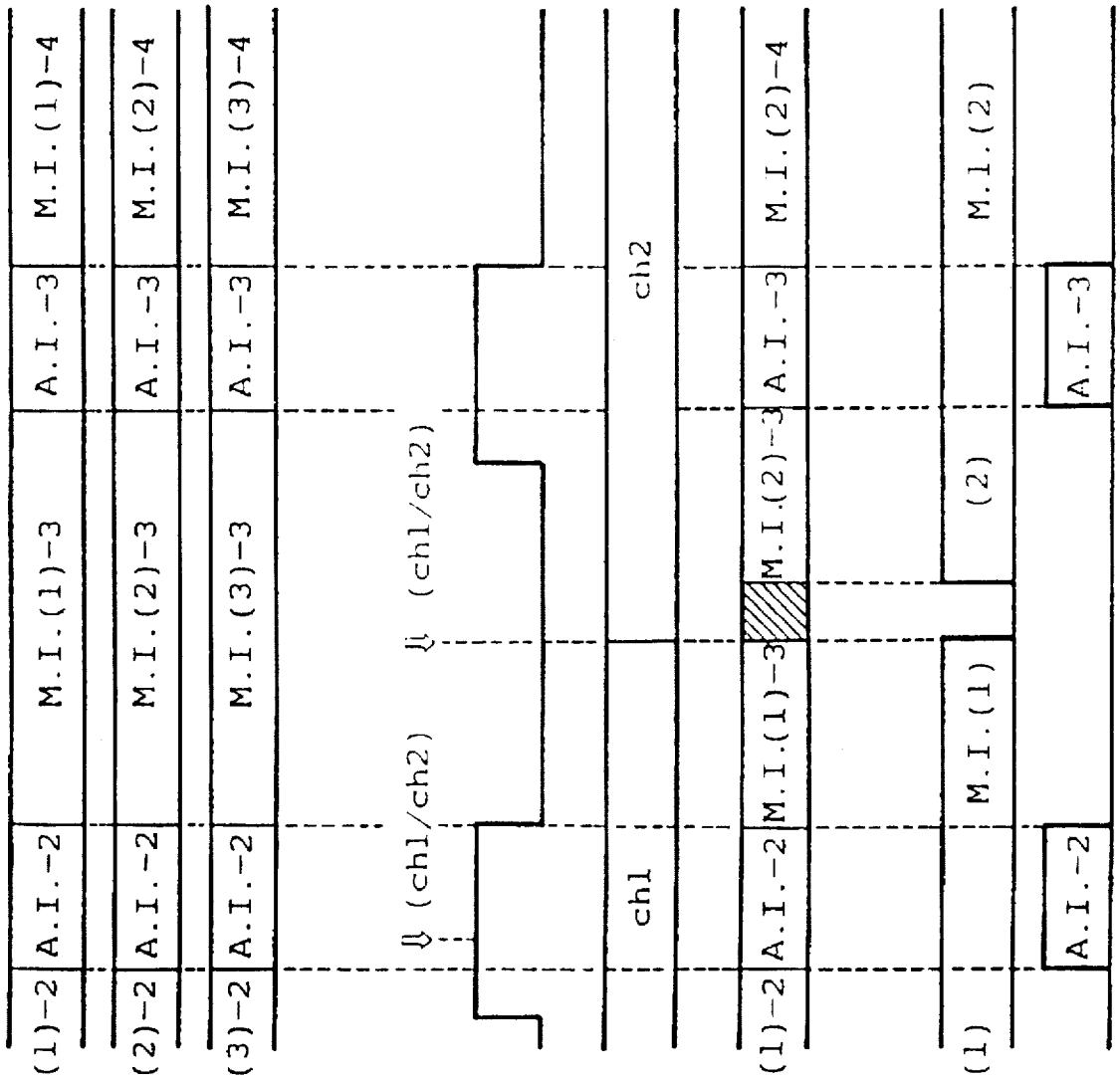
FIG. 3 is a timing chart illustrative of a latter half of the operation of the present invention.

Operation of the transmitter 1 and the receiver 2 will be described below with reference to FIGS. 2 and 3. FIG. 2 shows a timing chart illustrative of a former half of the operation, and FIG. 3 shows a timing chart illustrative of a latter half of the operation. In FIGS. 2 and 3, three items of main information (1)~(3) are transmitted in respective channels ch1~ch3, and control information is referred to as additional information.

The control information multiplexing means 1a of the transmitter 1 multiplexes each of the items of main information in the respective channels with control information at the same timing. As a result, the transmitting means 1b produces an output signal (S1) in the channel ch1 which comprises main information (1)-1, additional information-1, main information (1)-2, additional information-2, main information (1)-3, additional information-3, . . . that are time-division-multiplexed in the order named. Similarly, the transmitting means 1b produces an output signal (S2) in the channel ch2 which comprises main information (2)-1, additional information-1, main information (2)-2, additional information-2, main information (2)-3, additional information-3, ... that are time-division-multiplexed in the order named, and also an output signal (S3) in the channel ch3 which comprises main information (3)-1, additional information-1, main information (3)-2, additional information-2, main information (3)-3, additional information-3, ... that are time-division-multiplexed in the order named. The transmitting means 1b frequency-division-multiplexes and transmits these time-division-multiplexed signals in the respective channels. Therefore, the transmitted waves are composed of carriers of as many different frequencies as the number of the channels, and any carrier dedicated to transmit the additional information is not necessary.

In the receiver 2, the inhibit signal generating means 2a generates a channel change inhibit signal (S5) in timed relationship to the multiplexing of the additional information. The channel change inhibit signal is a signal which is kept high in level from a time that is ahead of the time to start receiving the additional information by a given period of time until the time to stop receiving the additional information. The given period of time is equal to an interval of time required for the extracting means 2b to change channels. Since the extracting means 2b stops extracting any signal until it completes changing of channels, it is made possible to reliably receive the additional information by including the above given period of time in the channel change inhibit signal.

The extracting means 2b normally extracts a signal in an indicated channel from the frequency-division-multiplexed signal transmitted from the transmitting means 1b. For example, since the channel ch3 is indicated in an initial stage in FIG. 2, the extracting means 2b extracts the main information (3)-1 in the channel ch3.

If the extracting means 2b receives a channel change signal (S4) indicative of a change from the channel ch3 to the channel ch1 as shown in FIG. 2, then since the inhibit signal generating means 2a is not generating a channel change inhibit signal (S5) at this time, the extracting means 2b effects a channel change from the channel ch3 to the channel ch1 (S6), and, after elapse of the interval of time (shown hatched in FIG. 3), extracts the main information (1)-1 in the channel ch1 from the frequency-division-multiplexed signal transmitted from the transmitting means 1b, and then extracts the additional information-1 and the mail information (1)-2 successively (S7).

If the extracting means 2b receives a channel change signal (S4) indicative of a change from the channel ch1 to the channel ch2 as shown in FIG. 3, then since the inhibit signal generating means 2a is generating a channel change inhibit signal (S5) at this time, the extracting means 2b does not effect a channel change from the channel ch1 to the channel ch2 (S6), and continuously extracts the signal in the channel ch1 from the frequency-division-multiplexed signal transmitted from the transmitting means 1b (S7).

As described above, the channel change inhibit signal is kept high in level from the time that is ahead of the time to start receiving the additional information by the given period of time until the time to stop receiving the additional information. During the high level of the channel change inhibit signal, the extracting means 2b is inhibited from changing channels for reliable reception of the additional information.

Consequently, the additional information is prevented from being interrupted in reception, but is reliably transmitted. No channel dedicated for transmitting the additional information is required, and the throughput of the additional information is not lowered by the transmission thereof in the same channels as the main information.

A multichannel communication system according to a first embodiment of the present invention will be described below with reference to FIGS. 4 through 7.

Figure 4:
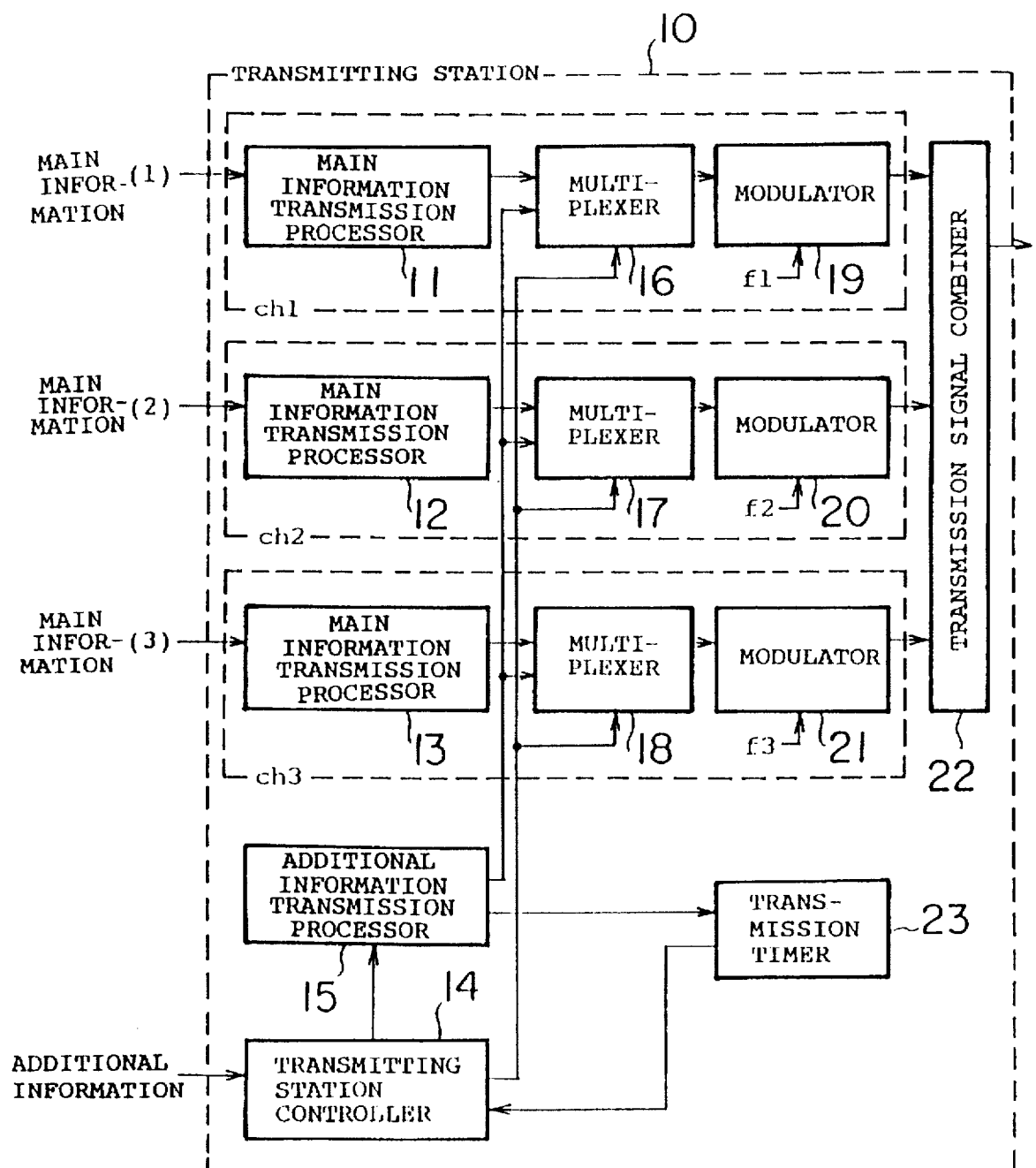
FIG. 4 is a block diagram of a transmitting station of a multichannel communication system according to a first embodiment of the present invention.

FIG. 4 shows in block form a transmitting station 10 of the multichannel communication system according to the first embodiment of the present invention. As shown in FIG. 4, the transmitting station 10 is supplied with three types of main information (1)-(3) in three channels ch1-ch3, for example, to be transmitted, and additional information in another channel (channel SV) which is common to the three types of main information (1)-(3). The additional information contains data relative to a reception limitation. The main information (1)-(3) is supplied to respective main information transmission processors 11-13, which process the supplied main information (1)-(3) into respective main information files. The additional information is supplied through a transmitting station controller 14 to an additional information transmission processor 15, which processes the supplied additional information into an additional information file. The transmitting station controller 14 generates a multiplex timing signal depending on a timing signal sent from a transmission timer 23, and transmits the generated multiplex timing signal to multiplexers 16-18. The multiplexers 16-18 time-division-multiplex the respective main information files from the respective main information transmission processors 11-13 and the additional information from the additional information transmission processor 15 according to the multiplex timing signal transmitted from the transmitting station controller 14. Modulators 19-21 modulates the time-division-multiplexed signals from the multiplexers 16-18 with respective carriers having respective different frequencies $f_1$-$f_3$ in respective channels. A transmission signal combiner 22 frequency-division-multiplexes the modulated signals in the respective channels, and transmits the frequency-division-multiplexed signals to a receiving station 30 shown in FIG. 5. The transmission timer 23 shown in FIG. 4 starts measuring time at the time the multiplexing of the additional information is completed, and outputs the timing signal when it completes the measuring of a first period of time Ts.

Figure 5:
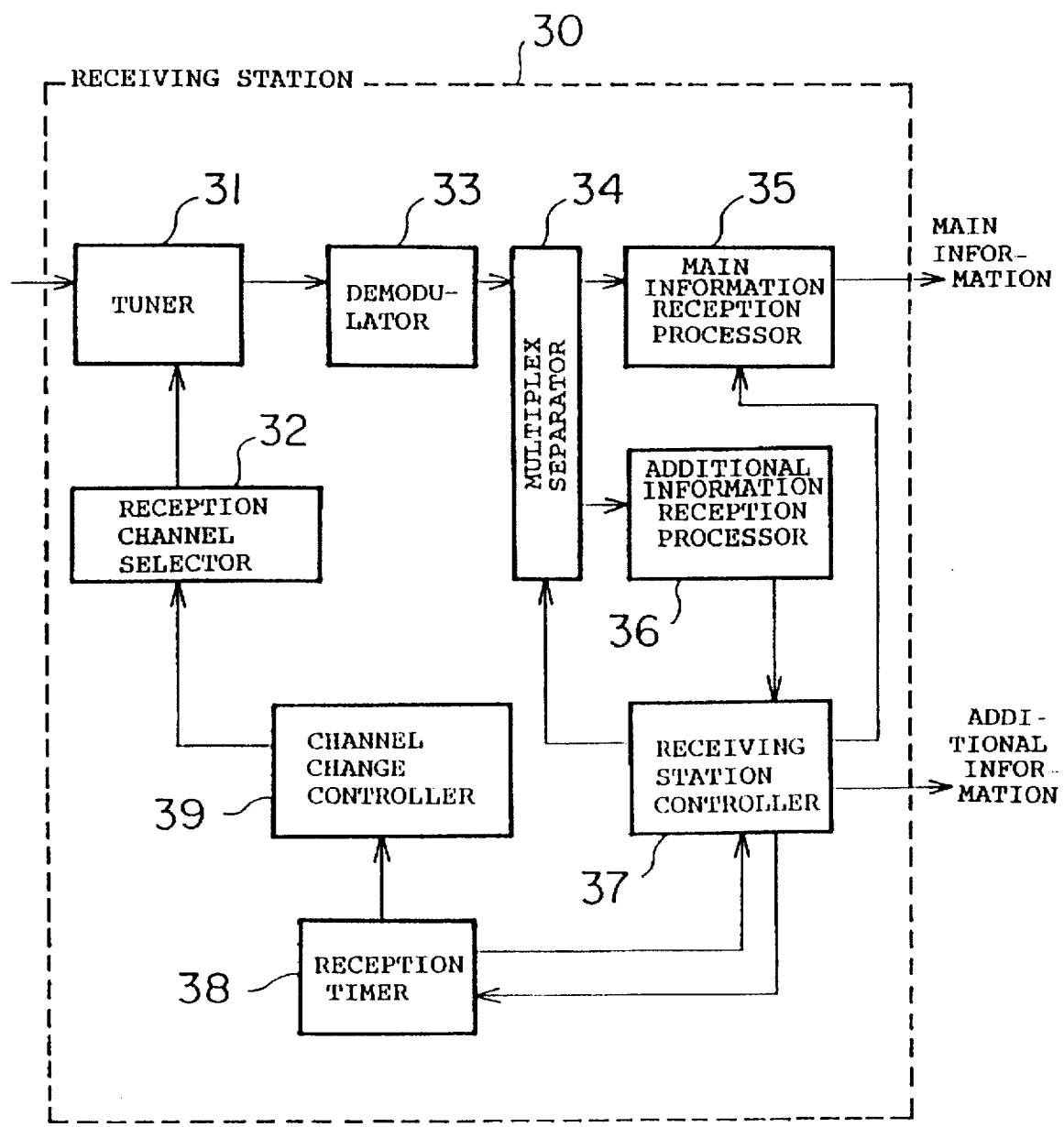
FIG. 5 is a block diagram of a receiving station of the multichannel communication system according to the first embodiment of the present invention.

FIG. 5 shows in block form a receiving station 30 of the multichannel communication system according to the first embodiment of the present invention. As shown in FIG. 5, the receiving station 10 has a tuner 31 which extracts the signal transmitted in one of the channels ch1-ch3 which is indicated by a reception channel selector 32, and a demodulator 33 which demodulates the extracted signal. A multiplex separator 34 separates the main information files and the additional information file from each other. A main information reception processor 35 reproduces the main information from the main information files, and an additional information reception processor 36 reproduces the additional information from the additional information file. A receiving station controller 37 controls the main information reception processor 35 according to the reproduced additional information to control the outputting of the main information from the receiving station 30. The receiving station controller 37 also controls a reception timer 38 to measure time at the time the reception of the additional information is finished. The reception timer 38 measures the first period of time Ts to estimate the time to receive next additional information, and sends the estimated time to the receiving station controller 37. Based on the estimated time, the receiving station controller 37 generates and sends a separation timing signal to the multiplex separator 34. The reception timer 38 indicates the elapse of a second period of time Tr (=Ts−Tc) from the time when the reception of the previous additional information is finished, to a channel change controller 39. Tc is a period of time (shown hatched in FIG. 6) required for the tuner 31 to change channels. Based on the indication from the reception timer 38, the channel change controller 39 generates a selection ON/OFF signal and sends the generated selection ON/OFF signal to the reception channel selector 32. The selection ON/OFF signal is a signal to inhibit channels from being changed even when there is an indication to change channels. The reception channel selector 32 receives a channel change indication signal from outside of the receiving station 30, and indicates a channel to be selected to the tuner 31. The reception channel selector 32 changes its channel indication depending on the selection ON/OFF signal from the channel change controller 39. Operation of the reception channel selector 32 will be described later on with reference to FIGS. 6 and 7.

Figure 6:
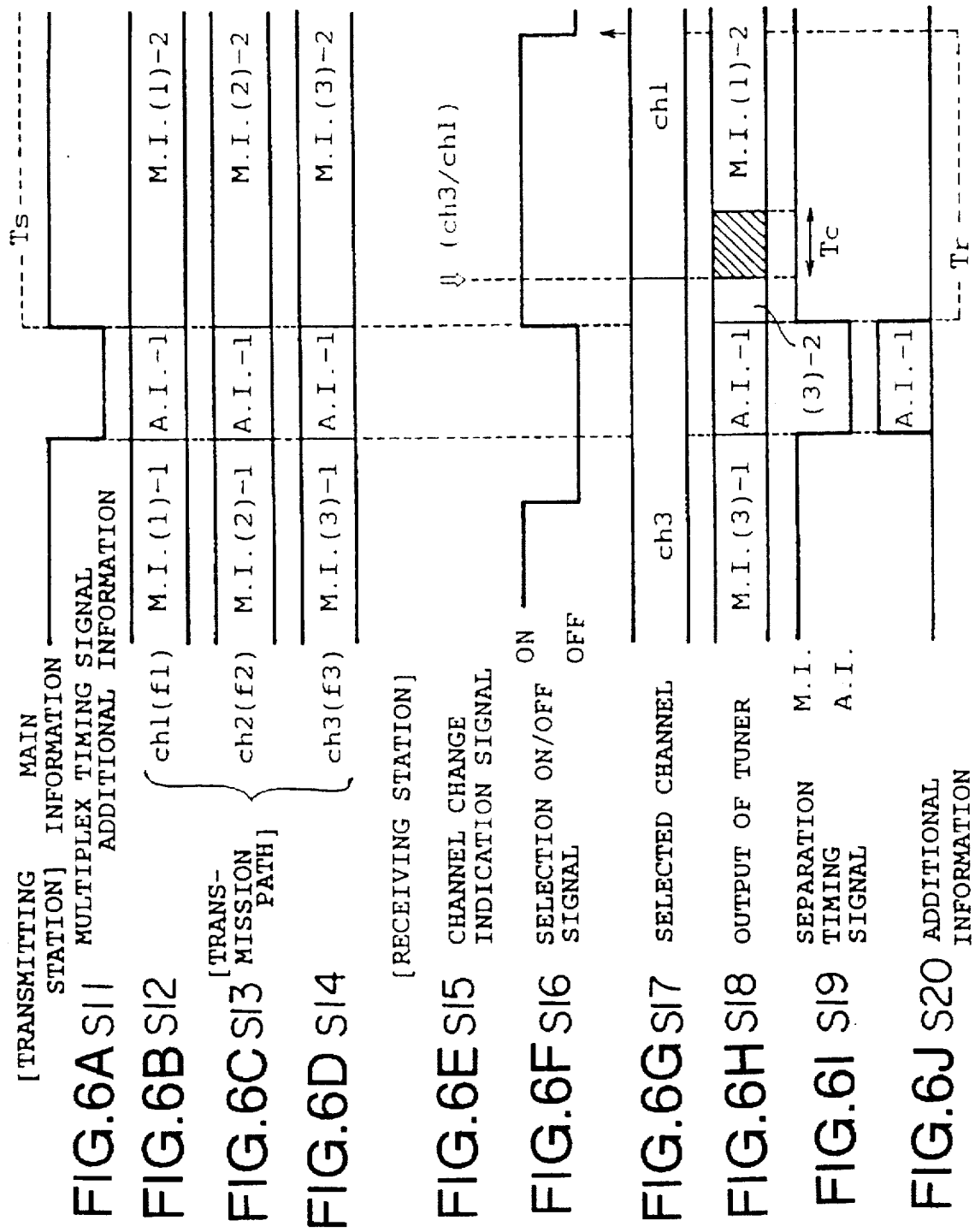
FIG. 6 is a timing chart illustrative of a former half of operation of the multichannel communication system according to the first embodiment of the present invention.
Figure 7:
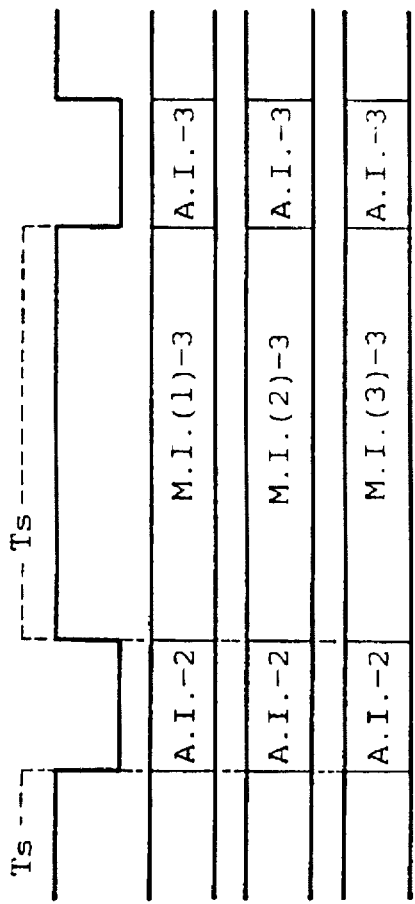
FIG. 7 is a timing chart illustrative of a latter half of operation of the multichannel communication system according to the first embodiment of the present invention.

Operation of the multichannel communication system according to the first embodiment will be described below with reference to FIGS. 6 and 7. FIG. 6 shows a timing chart representing a former half of the operation, and FIG. 7 shows a timing chart representing a latter half of the operation.

In the transmitting station 10, the transmitting station controller 14 generates a multiplex timing signal (S11) based on a timing signal from the transmission timer 23. Based on the multiplex timing signal, the multiplexers 16~18 time-division-multiplex the mail information (1)~(3) in the respective channels with the same additional information at the same timing. As a result, the transmission signal combiner 22 produces an output signal (S12) in the channel ch1 which comprises main information (1)-1, additional information-1, main information (1)-2, additional information-2, main information (1)-3, additional information-3, . . . that are time-division-multiplexed in the order named. Similarly, the transmission signal combiner 22 produces an output signal (S13) in the channel ch2 which comprises main information (2)-1, additional information-1, main information (2)-2, additional information-2, main information (2)-3, additional information-3, . . . that are time-division-multiplexed in the order named, and also an output signal (S14) in the channel ch3 which comprises main information (3)-1, additional information-1, main information (3)-2, additional information-2, main information (3)-3, additional information-3, . . . that are time-division-multiplexed in the order named. The transmission signal combiner 22 frequency-division-multiplexes and transmits these time-division-multiplexed signals in the respective channels. Therefore, the transmitted waves are composed of carriers of as many different frequencies as the number of the channels, and any carrier dedicated to transmit the additional information is not necessary.

In the receiving station 30, the channel change controller 39 generates a selection ON/OFF signal (S16). The selection ON/OFF signal is a signal which is ON (high in level) from the time when the reception of previous additional information is finished to the time when the second period of time Tr elapses, and OFF (low in level) in other intervals of time. The intervals of time in which the selection ON/OFF signal is OFF correspond to those periods in which the additional information would not reach the receiving station 30 if channels were changed in the tuner 31.

The tuner 31 normally extracts a signal in a channel indicated by the reception channel selector 32 from the frequency-division-multiplexed signal transmitted from the transmitting station 10. For example, since the channel ch3 is indicated in an initial stage in FIG. 6, the tuner 31 extracts the main information (3)-1 in the channel ch3, and then extracts the additional information-1 and the main information (3)-1 (S18).

It is assumed that the reception channel selector 32 receives a channel change indication signal (S15) indicative of a change from the channel ch3 to the channel ch1, as shown in FIG. 6. At this time, since the selection ON/OFF signal (S16) sent from the channel change controller 39 is not OFF, the reception channel selector 32 enables the tuner 31 to change channels (S17), and after elapse of the period of time Tc, the tuner 31 extracts the main information (1)-2 in the channel ch1 from the frequency-division-multiplexed signal transmitted from the transmitting station 10, and outputs the extracted main information (1)-2 (S18). In the period of time Tc (shown hatched in FIG. 6), the tuner 31 effects and completes a channel change from the channel ch3 to the channel ch1, and stops extracting any signal.

The multiplex separator 34 separates the additional information file (S20) in response to a separation timing signal (S19) from the receiving station controller 37.

It is then assumed that the reception channel selector 32 receives a channel change indication signal (S15) indicative of a change from the channel ch1 to the channel ch2, as shown in FIG. 7. At this time, since the selection ON/OFF signal (S16) sent from the channel change controller 39 is OFF, the reception channel selector 32 holds the tuner 31 from changing channels (S17), and the tuner 31 continuously extracts the signal in the channel ch1 from the frequency-division-multiplexed signal transmitted from the transmitting station 10, and outputs the extracted signal (S18).

As described above, the intervals of time in which the selection ON/OFF signal (16) is OFF correspond to those periods in which the additional information would not reach the receiving station 30 if channels were changed in the tuner 31. Because any channel change is inhibited in these intervals of time, however, the additional information is reliably received by the receiving station 30. In this embodiment, a change from the channel ch1 to the channel ch2 is not performed even in the presence of a channel change indication signal (S15) indicative of such a channel change. Such a channel change can be performed when a channel change indication signal (S15) is issued again to the reception channel selector 32.

It is further assumed that the reception channel selector 32 thereafter receives a channel change indication signal (S15) indicative of a change from the channel ch1 to the channel ch3, as shown in FIG. 7. At this time, since the selection ON/OFF signal (S16) sent from the channel change controller 39 is ON, the reception channel selector 32 enables the tuner 31 to change channels (S17), and after elapse of the period of time Tc, the tuner 31 extracts them in information (3)-3 in the channel ch1 from the frequency-division-multiplexed signal transmitted from the transmitting station 10, and outputs the extracted main information (3)-1, and then extracts and outputs the additional information-3 (S18).

In this manner, any additional information is prevented from being interrupted in reception, but is reliably transmitted. No channel dedicated for transmitting the additional information is required, and the throughput of the additional information is not lowered by the transmission thereof in the same channels as the main information.

Figure 8:
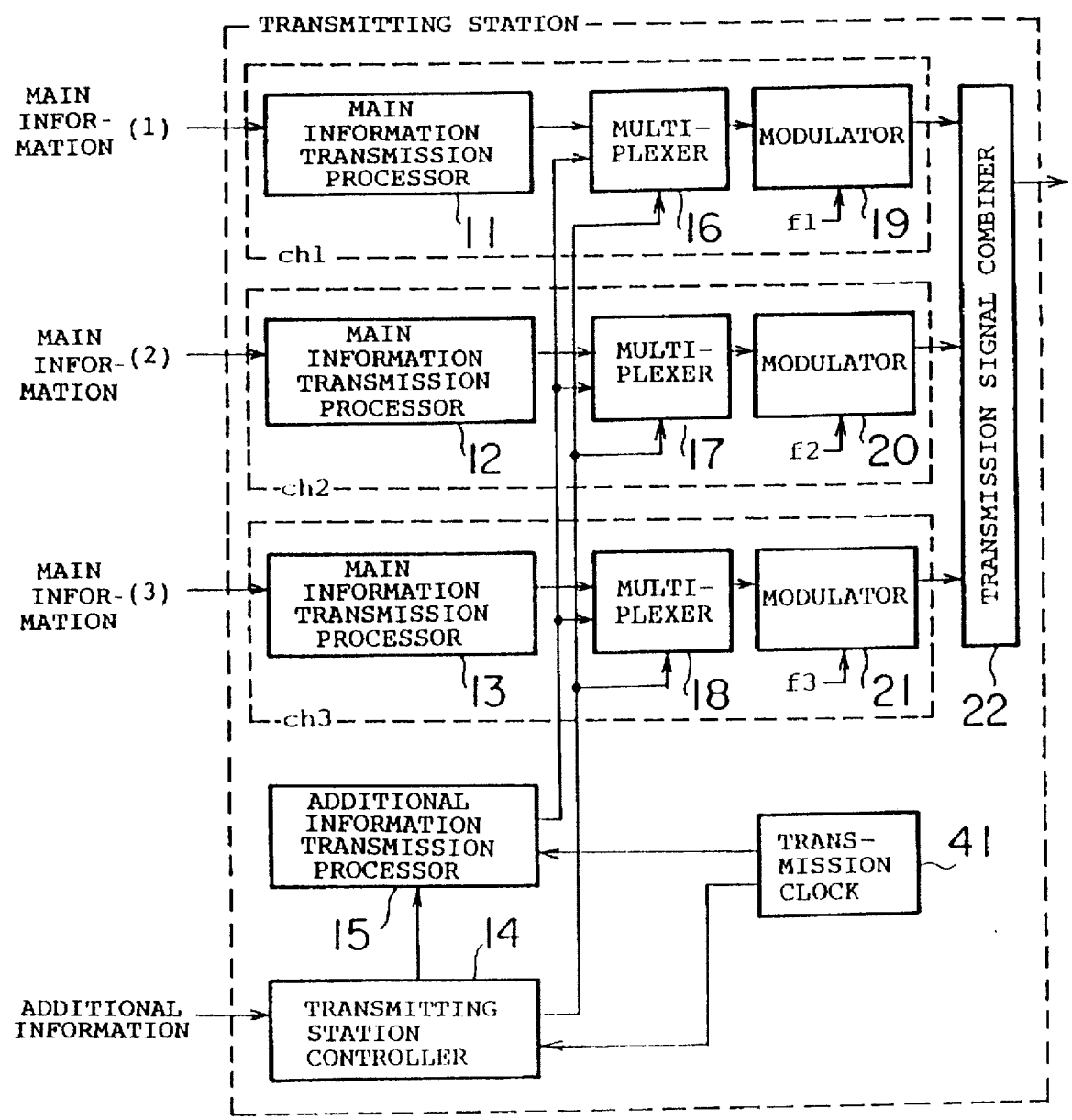
FIG. 8 is a block diagram of a transmitting station of a multichannel communication system according to a second embodiment of the present invention.

FIG. 8 shows in block form a transmitting station of a multichannel communication system according to a second embodiment of the present invention. The transmitting station shown in FIG. 8 is essentially similar to the transmitting station of the multichannel communication system according to the first embodiment. Therefore, those parts of the transmitting station shown in FIG. 8 which are identical to those of the transmitting station of the multichannel communication system according to the first embodiment are denoted by identical reference numerals, and will not be described in detail. Only those parts of transmitting station shown in FIG. 8 which are different from those of the transmitting station of the multichannel communication system according to the first embodiment will be described in detail below.

The transmitting station according to the second embodiment shown in FIG. 8 has a transmission clock 41 in place of the transmission timer 23 in the transmitting station of the multichannel communication system according to the first embodiment. The transmission clock 41 measures time, and outputs a timing signal to the transmitting station controller 14 and the additional information transmission processor 15 when preset times T1, T2, T3, . . . are reached. The preset times T1, T2, T3, . . . are times at which the additional information starts being multiplexed. In response to the timing signal sent from the transmission clock 41, the transmitting station controller 14 generates a multiplex timing signal and transmits the generated multiplex timing signal to the multiplexers 16~18.

Figure 9:
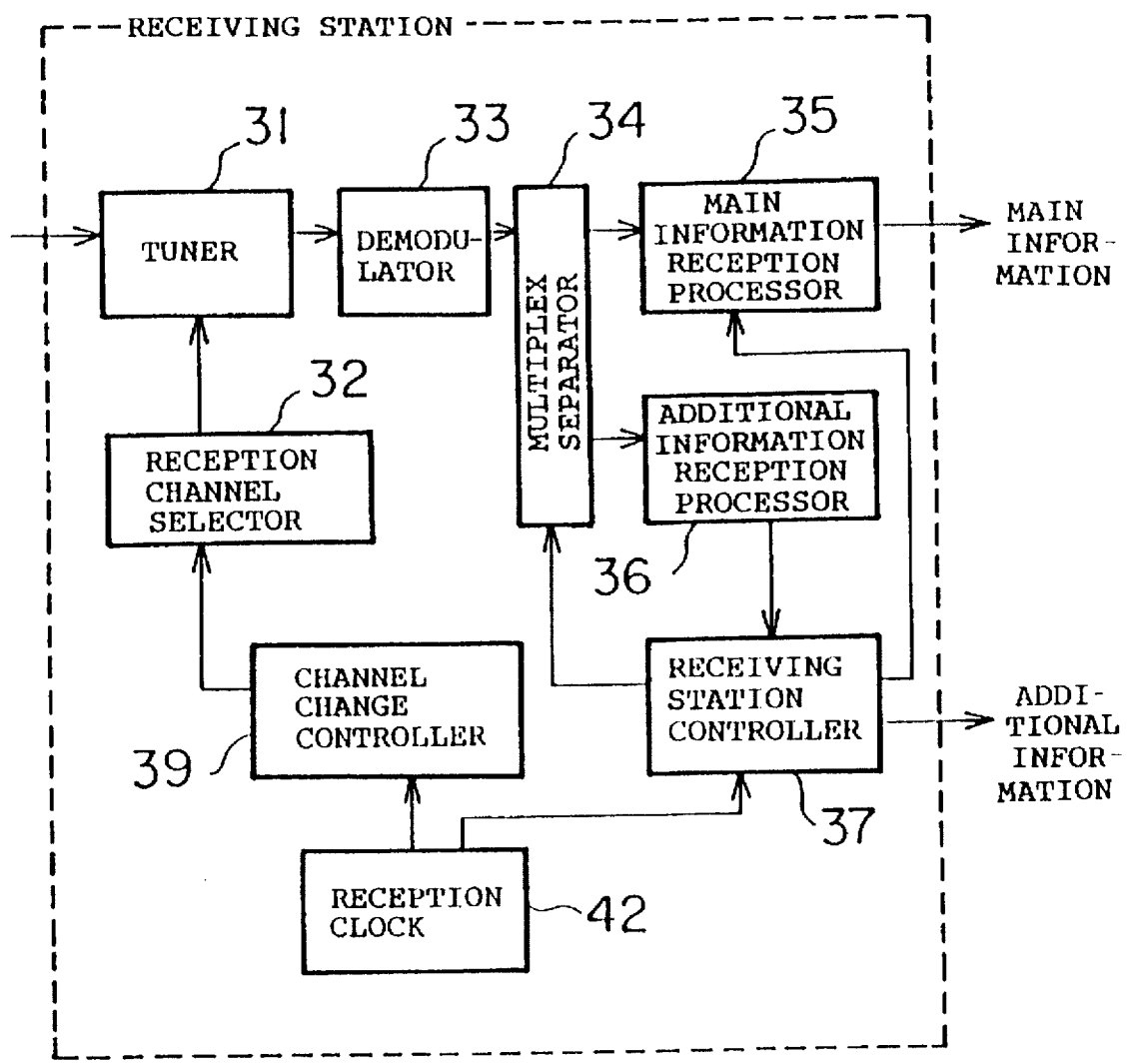
FIG. 9 is a block diagram of a receiving station of the multichannel communication system according to the second embodiment of the present invention.

FIG. 9 shows in block form a receiving station of the multichannel communication system according to the second embodiment of the present invention. The receiving station shown in FIG. 9 is essentially similar to the receiving station of the multichannel communication system according to the first embodiment. Therefore, those parts of the receiving station shown in FIG. 9 which are identical to those of the receiving station of the multichannel communication system according to the first embodiment are denoted by identical reference numerals, and will not be described in detail. Only those parts of receiving station shown in FIG. 9 which are different from those of the receiving station of the multichannel communication system according to the first embodiment will be described in detail below.

The receiving station according to the second embodiment shown in FIG. 9 has a reception clock 42 in place of the reception timer 38 in the receiving station of the multichannel communication system according to the first embodiment. The reception clock 42 measures time synchronously with the transmission clock 41, and indicates when preset times T1, T2, T3, . . . are reached to the receiving station controller 37, and also indicates when preset times T1-i, T1-j, T2-i, T2-j, T3-i, T3-j, . . . are reached to the channel change controller 39. The preset times T1, T2, T3, . . . are times at which the OFF periods of the selection ON/OFF signal begin, and the preset times T1-i, T1-j, T2-i, T2-j, T3-i, T3-j, . . . are times at which the OFF periods of the selection ON/OFF signal end. Based on the indicated times sent from the reception clock 42, the channel change controller 39 generates and sends the selection ON/OFF signal to the reception channel selector 32.

Figure 10:
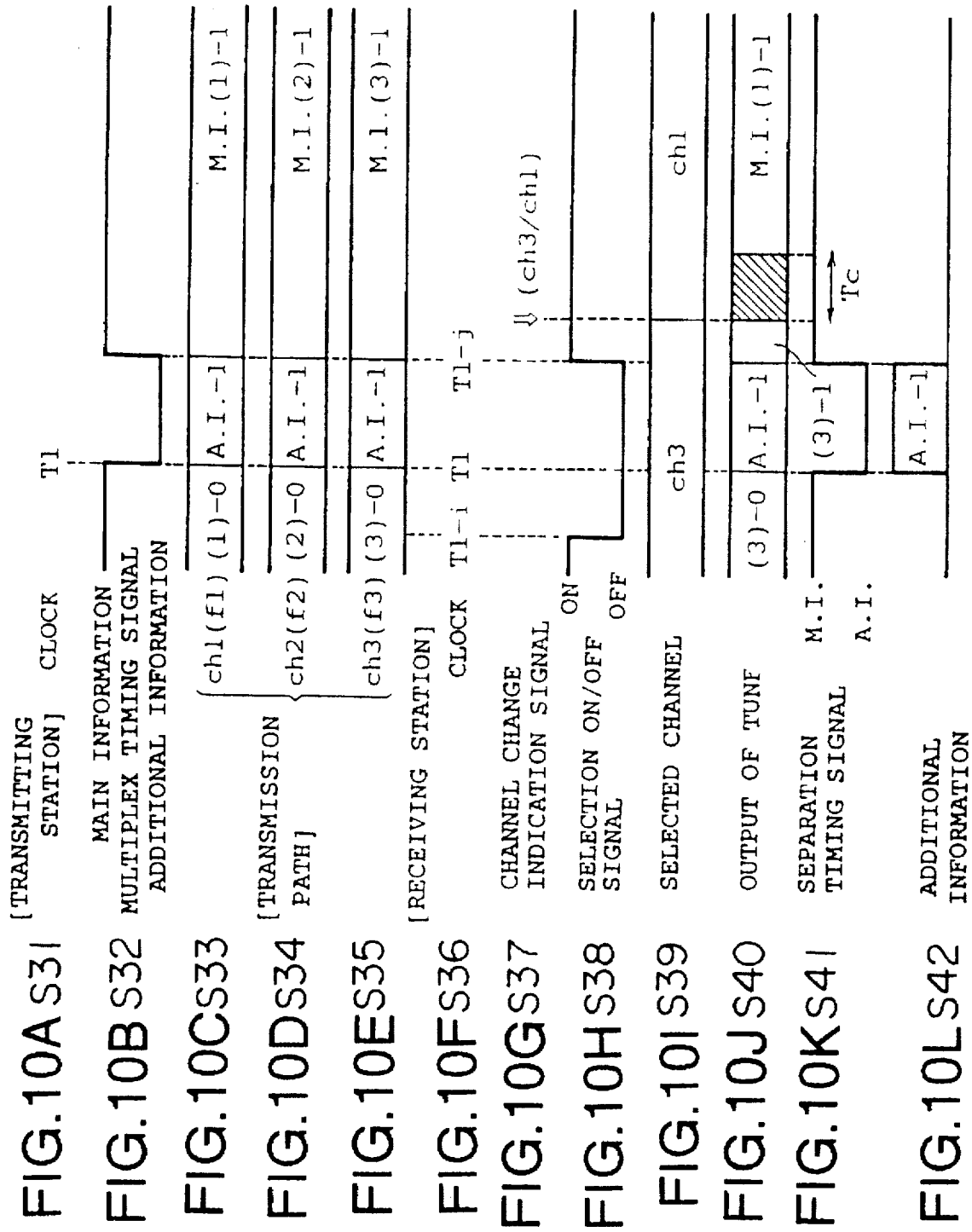
FIG. 10 is a timing chart illustrative of a former half of operation of the multichannel communication system according to the second embodiment of the present invention.
Figure 11:
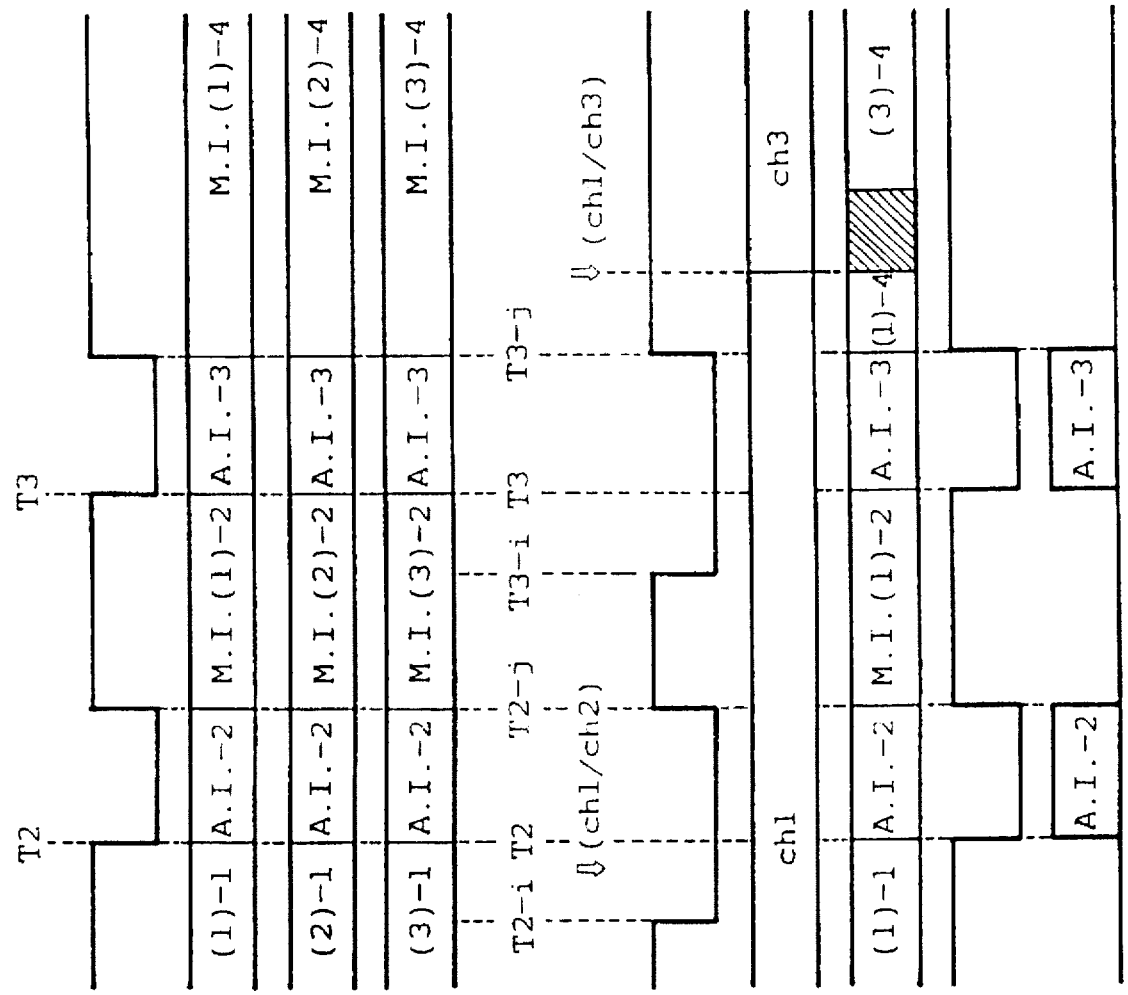
FIG. 11 is a timing chart illustrative of a latter half of operation of the multichannel communication system according to the second embodiment of the present invention.

Operation of the multichannel communication system according to the second embodiment will be described below with reference to FIGS. 10 and 11. FIG. 10 shows a timing chart representing a former half of the operation; and FIG. 11 shows a timing chart representing a latter half of the operation.

In the transmitting station, the transmission clock 41 measures the preset times T1, T2, T3, . . . (S31), and the transmitting station controller 14 generates a multiplex timing signal (S32) based on the preset times T1, T2, T3, . . . and sends the multiplex timing signal to the multiplexers 16~18. Based on the multiplex timing signal, the multiplexers 16~18 time-division-multiplex the main information (1)~(3) in the respective channels with the same additional information at the same timing (S33~S35).

In the receiving station, the channel change controller 39 generates a selection ON/OFF signal (S38) based on the indications from the reception clock 42. The tuner 31 normally extracts a signal in a channel indicated by the reception channel selector 32 from the frequency-division-multiplexed signal transmitted from the transmitting station. For example, since the channel ch3 is indicated in an initial stage in FIG. 10, the tuner 31 extracts them in information (3)-0 in the channel ch3, and then extracts the additional information-1 and the main information (3)-1 (S40).

It is assumed that the reception channel selector 32 receives a channel change indication signal (S37) indicative of a change from the channel ch3 to the channel ch1, as shown in FIG. 10. At this time, since the selection ON/OFF signal (S38) sent from the channel change controller 39 is ON, the reception channel selector 32 enables the tuner 31 to change channels (S39), and after elapse of the period of time Tc, the tuner 31 extracts the main information (1)-1 in the channel ch1 from the frequency-division-multiplexed signal transmitted from the transmitting station, and outputs the extracted main information (1)-1 (S40). In the period of time Tc (shown hatched in FIG. 10), the tuner 31 effects and completes a channel change from the channel ch3 to the channel ch1, and stops extracting any signal.

The multiplex separator 34 separates the additional information file (S42) in response to a separation timing signal (S41) from the receiving station controller 37.

It is then assumed that the reception channel selector 32 receives a channel change indication signal (S37) indicative of a change from the channel ch1 to the channel ch2, as shown in FIG. 11. At this time, since the selection ON/OFF signal (S38) sent from the channel change controller 39 is OFF, the reception channel selector 32 holds the tuner 31 from changing channels (S39), and the tuner 31 continuously extracts the signal in the channel ch1 from the frequency-division-multiplexed signal transmitted from the transmitting station 10, and outputs the extracted signal (S40).

As with the first embodiment, the intervals of time in which the selection ON/OFF signal (S38) is OFF correspond to those periods in which the additional information would not reach the receiving station if channels were changed in the tuner 31. Because any channel change is inhibited in these intervals of time, however, the additional information is reliably received by the receiving station.

Figure 12:
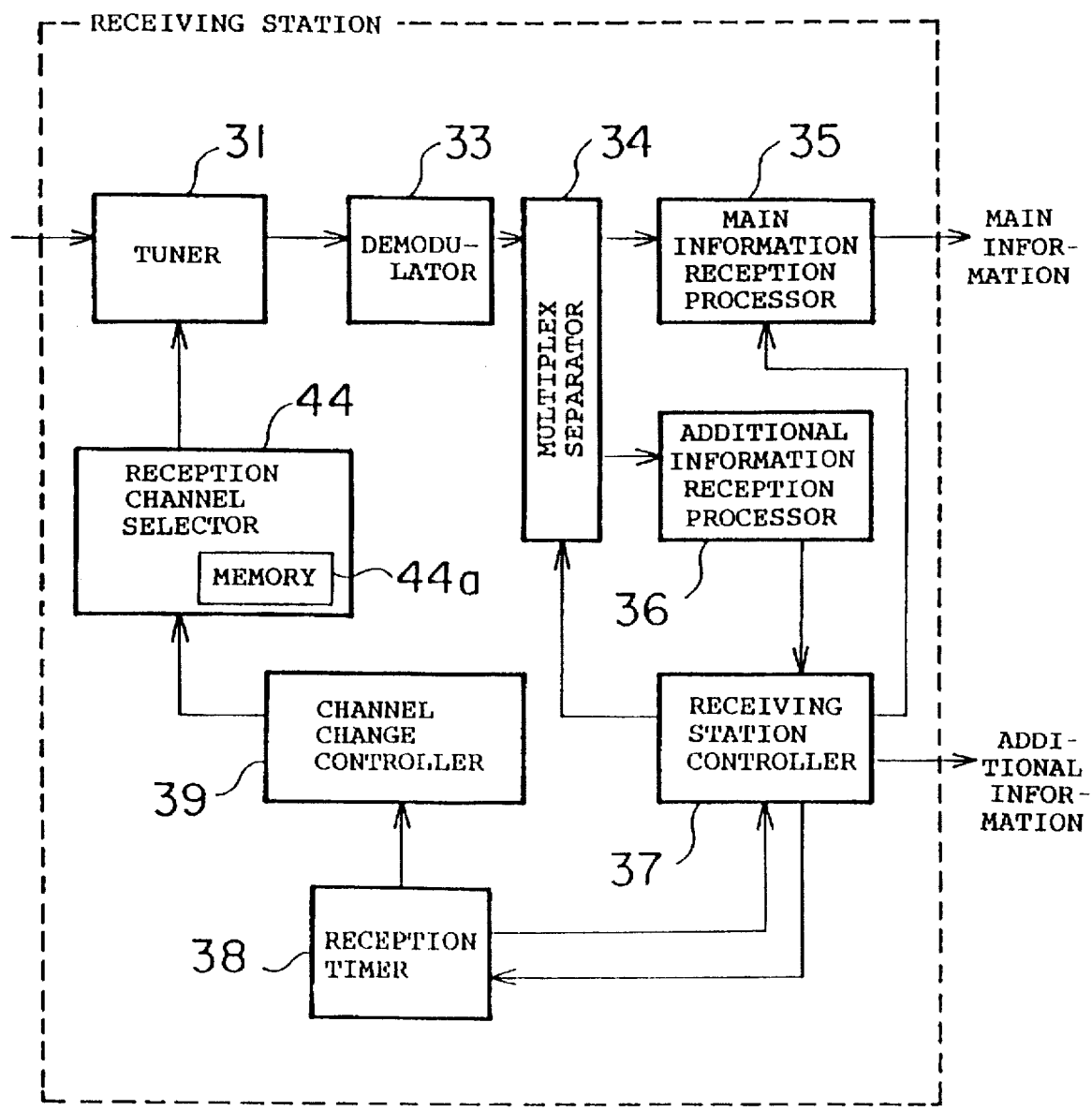
FIG. 12 is a block diagram of a receiving station of a multichannel communication system according to a third embodiment of the present invention.

FIG. 12 shows in block form a receiving station of a multichannel communication system according to a third embodiment of the present invention. The multichannel communication system according to the third embodiment of the present invention has a transmitting station which is identical to the transmitting station of the multichannel communication system according to the first embodiment of the present invention. Therefore, the transmitting station of the multichannel communication system according to the third embodiment of the present invention will not be described below. The receiving station shown in FIG. 12 is essentially similar to the receiving station of the multichannel communication system according to the first embodiment. Therefore, those parts of the receiving station shown in FIG. 12 which are identical to those of the receiving station of the multichannel communication system according to the first embodiment are denoted by identical reference numerals, and will not be described in detail. Only those parts of receiving station shown in FIG. 12 which are different from those of the receiving station of the multichannel communication system according to the first embodiment will be described in detail below.

The receiving station according to the third embodiment shown in FIG. 12 has a reception channel selector 44 in place of the reception channel selector 32 of the multichannel communication system according to the first embodiment. The reception channel selector 44 includes a memory 44a therein. The reception channel selector 44 has the same function as that of the reception channel selector 32 of the multichannel communication system according to the first embodiment. In addition, when the reception channel selector 44 receives a channel change indication signal, the reception channel selector 44 stores a new channel indicated by the channel change indication signal in the memory 44a if the selection ON/OFF signal from the channel change controller 39 is in an OFF period. Thereafter, the reception channel selector 44 monitors the selection ON/OFF signal, and immediately after the selection ON/OFF signal becomes ON, the reception channel selector 44 reads the indicated channel from the memory 44a, and enables the tuner 31 to extract a signal in the indicated channel.

When the reception channel selector 44 receives a channel change indication signal, if the selection ON/OFF signal from the channel change controller 39 is in an ON period, then the reception channel selector 44 immediately enables the tuner 31 to extract a signal in the channel indicated by the channel change indication signal.

As described above, a new channel indicated by the channel change indication signal is stored in the memory 44a, and immediately after the channel change controller 39 becomes ON, the reception channel selector 44 reads the indicated channel from the memory 44a, and enables the tuner 31 to extract a signal in the indicated channel. Therefore, the receiving station according to the third embodiment is free of the drawback that channels cannot be changed even in the presence of a channel change indication signal as with the first embodiment.

Figure 13:
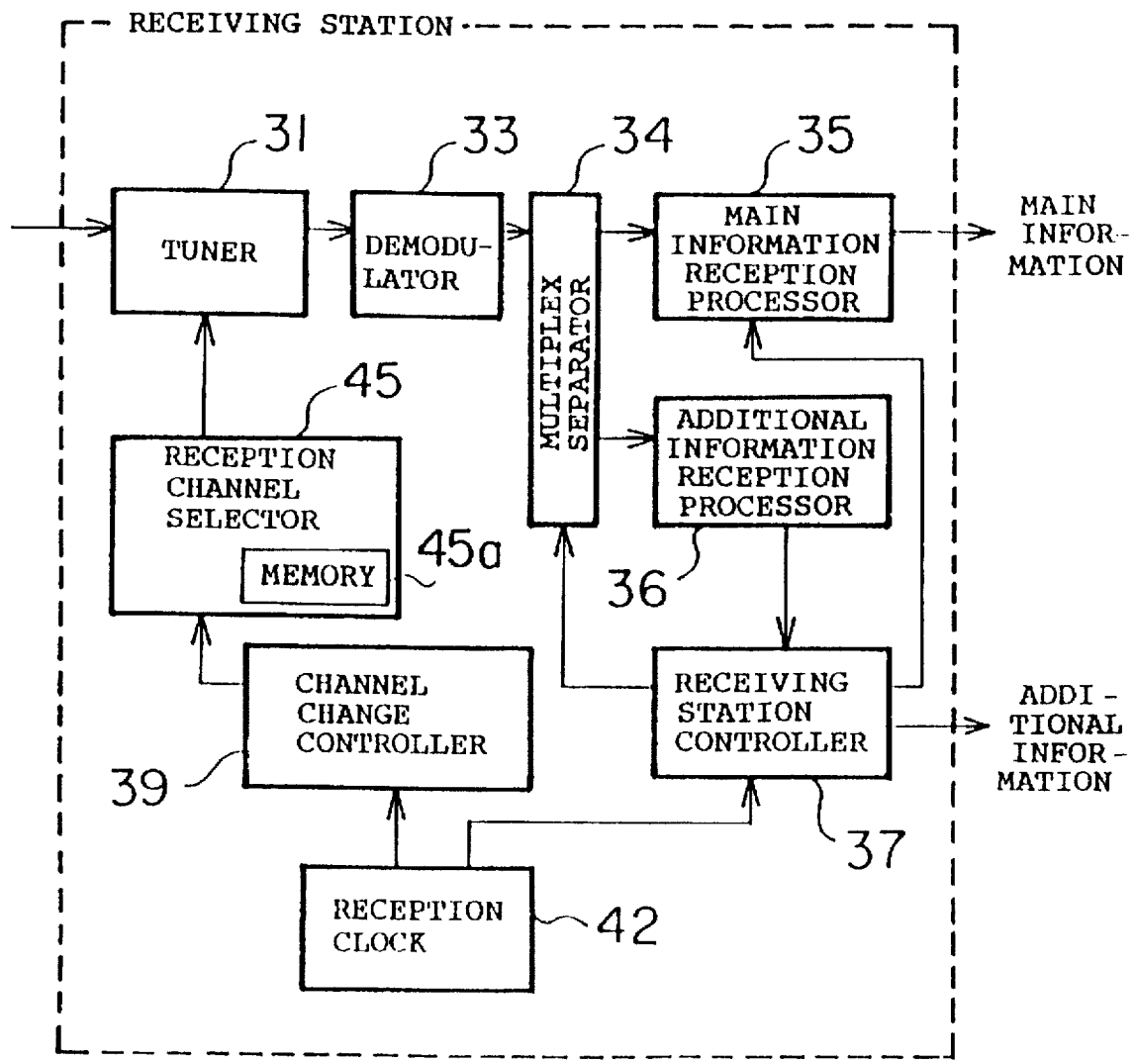
FIG. 13 is a block diagram of a receiving station of a multichannel communication system according to a fourth embodiment of the present invention.

FIG. 13 shows in block form a receiving station of a multichannel communication system according to a fourth embodiment of the present invention. The multichannel communication system according to the fourth embodiment of the present invention has a transmitting station which is identical to the transmitting station of the multichannel communication system according to the second embodiment of the present invention. Therefore, the transmitting station of the multichannel communication system according to the fourth embodiment of the present invention will not be described below. The receiving station shown in FIG. 13 is essentially similar to the receiving station of the multichannel communication system according to the second embodiment. Therefore, those parts of the receiving station shown in FIG. 13 which are identical to those of the receiving station of the multichannel communication system according to the second embodiment are denoted by identical reference numerals, and will not be described in detail. Only those parts of receiving station shown in FIG. 13 which are different from those of the receiving station of the multichannel communication system according to the second embodiment will be described in detail below.

The receiving station according to the fourth embodiment shown in FIG. 13 has a reception channel selector 45 in place of the reception channel selector 32 of the multichannel communication system according to the second embodiment. The reception channel selector 45 includes a memory 45a therein. The reception channel selector 45 has the same function as that of the reception channel selector 32 of the multichannel communication system according to the second embodiment. In addition, when the reception channel selector 45 receives a channel change indication signal, the reception channel selector 45 stores a new channel indicated by the channel change indication signal in the memory 45a if the selection ON/OFF signal from the channel change controller 39 is in an OFF period. Thereafter, the reception channel selector 45 monitors the selection ON/OFF signal, and immediately after the selection ON/OFF signal becomes ON, the reception channel selector 45 reads the indicated channel from the memory 45a, and enables the tuner 31 to extract a signal in the indicated channel.

When the reception channel selector 45 receives a channel change indication signal, if the selection ON/OFF signal from the channel change controller 39 is in an ON period, then the reception channel selector 44 immediately enables the tuner 31 to extract a signal in the channel indicated by the channel change indication signal.

As described above, a new channel indicated by the channel change indication signal is stored in the memory 45a, and immediately after the channel change controller 39 becomes ON, the reception channel selector 45 reads the indicated channel from the memory 45a, and enables the tuner 31 to extract a signal in the indicated channel. Therefore, the receiving station according to the fourth embodiment is free of the drawback that channels cannot be changed even in the presence of a channel change indication signal as with the second embodiment.

Figure 14:
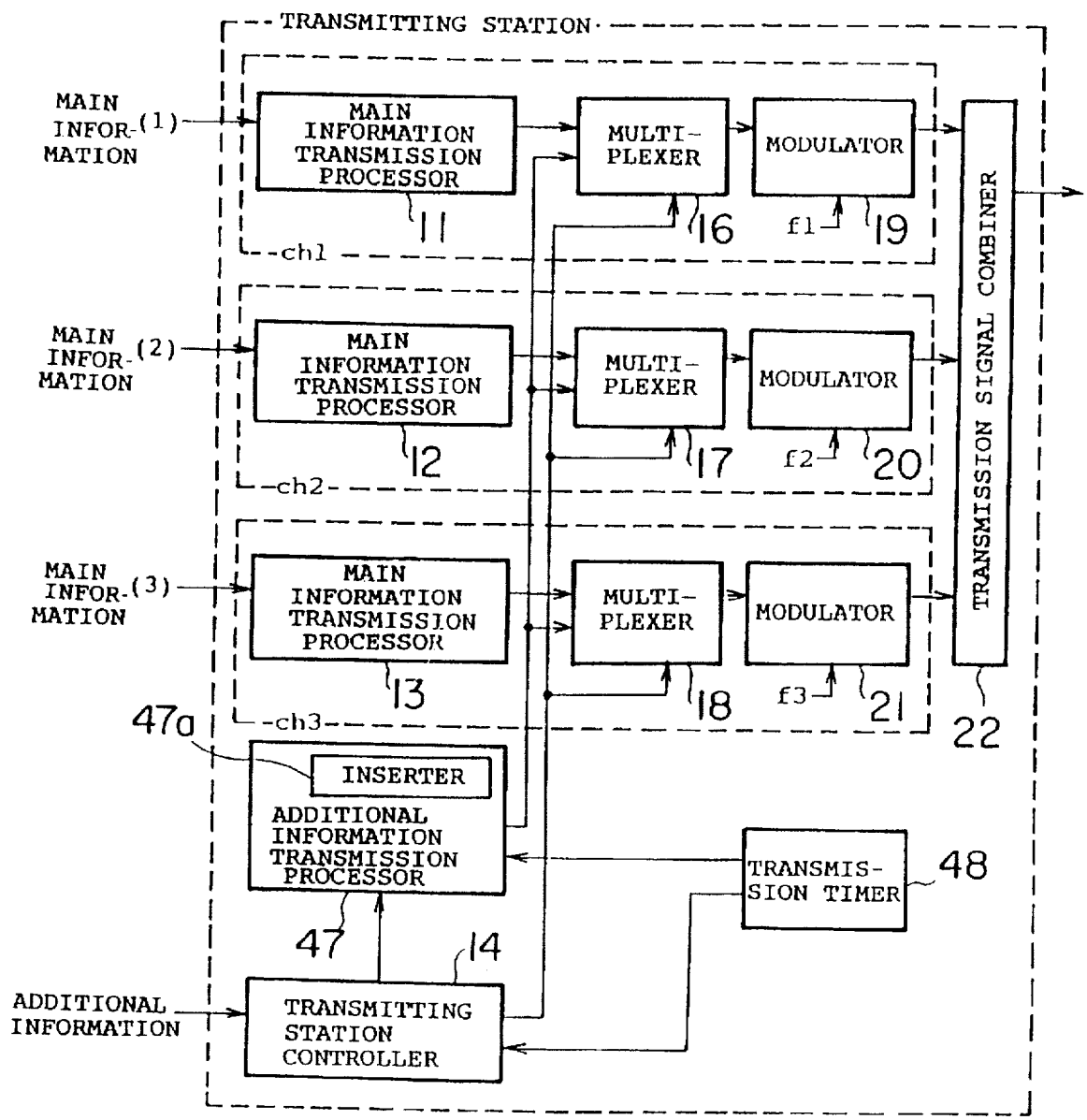
FIG. 14 is a block diagram of a transmitting station of a multichannel communication system according to a fifth embodiment of the present invention.

FIG. 14 shows in block form a transmitting station of a multichannel communication system according to a fifth embodiment of the present invention. The transmitting station shown in FIG. 14 is essentially similar to the transmitting station of the multichannel communication system according to the first embodiment. Therefore, those parts of the transmitting station shown in FIG. 14 which are identical to those of the transmitting station of the multichannel communication system according to the first embodiment are denoted by identical reference numerals, and will not be described in detail. Only those parts of transmitting station shown in FIG. 14 which are different from those of the transmitting station of the multichannel communication system according to the first embodiment will be described in detail below.

The transmitting station shown in FIG. 14 has an additional information transmission processor 47 in place of the additional information transmission processor 15 of the multichannel communication system according to the first embodiment, the additional information transmission processor 47 having an inserter 47a therein. The transmitting station shown in FIG. 14 also has a transmission timer 48 in place of the transmission timer 23 of the multichannel communication system according to the first embodiment. The additional information transmission processor 47 has the same function as that of the additional information transmission processor 15 of the multichannel communication system according to the first embodiment. In addition, the inserter 47a inserts time interval data indicative of a time interval until next additional information is transmitted, into an additional information file. The transmission timer 48 starts measuring time when the multiplexing of additional information is finished, measures the first period of time Ts based on the time interval data which has previously been inserted, and outputs a timing signal.

Figure 15:
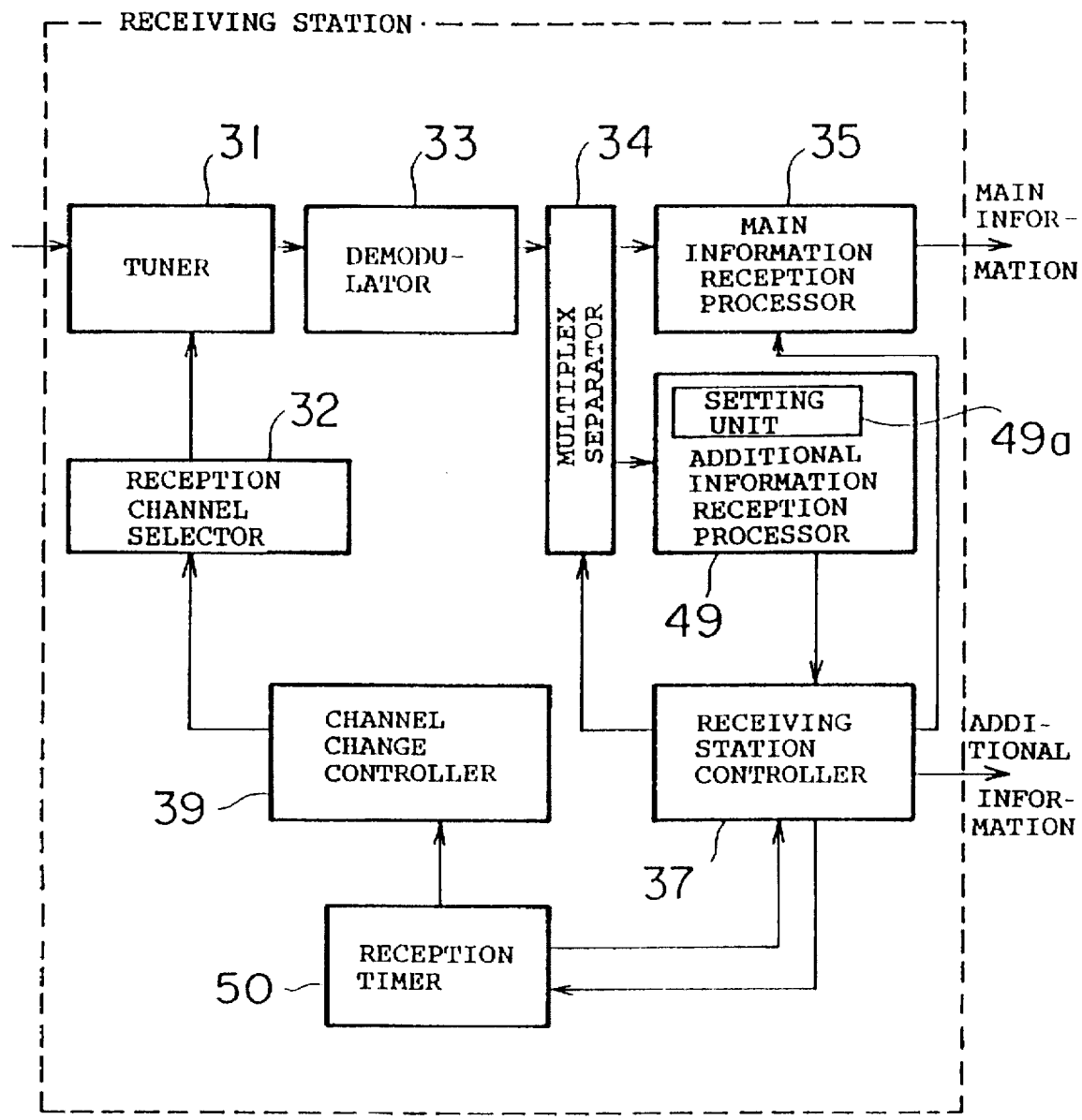
FIG. 15 is a block diagram of a receiving station of the multichannel communication system according to the fifth embodiment of the present invention.

FIG. 15 shows in block form a receiving station of the multichannel communication system according to the fifth embodiment of the present invention. The receiving station shown in FIG. 15 is essentially similar to the receiving station of the multichannel communication system according to the first embodiment. Therefore, those parts of the receiving station shown in FIG. 15 which are identical to those of the receiving station of the multichannel communication system according to the first embodiment are denoted by identical reference numerals, and will not be described in detail. Only those parts of receiving station shown in FIG. 15 which are different from those of the receiving station of the multichannel communication system according to the first embodiment will be described in detail below.

The receiving station shown in FIG. 15 has an additional information reception processor 49 in place of the additional information reception: processor 36 of the multichannel communication system according to the first embodiment, the additional information reception processor 49 having a setting unit 49a therein. The receiving station shown in FIG. 15 also has a reception timer 50 in place of the reception timer 38 of the multichannel communication system according to the first embodiment. The additional information transmission processor 49 has the same function as that of the additional information reception processor 36 of the multichannel communication system according to the first embodiment. In addition, the setting unit 49a removes the time interval data inserted in the additional information, and sends the time interval data through the receiving station controller 37 to the reception timer 50 in which the time interval data is set as the first period of time Ts. The reception timer 50 starts measuring time at the time the reception of the additional information is finished, and, based on the first period of time Ts, the reception timer 50 indicates the time to receive next additional information to the receiving station controller 37 and also indicates the time when the OFF period of a next selection ON/OFF signal starts to the channel change controller 39.

The other details of operation of the multichannel communication system according to the fifth embodiment are the same as those of the multichannel communication system according to the first embodiment, so that the multichannel communication system according to the fifth embodiment prevents additional information from being interrupted in reception, but reliably transmits additional information.

According to the fifth embodiment, as described above, the time to multiplex the additional information file is not fixed, but is set each time the additional information file is multiplexed. Therefore, the additional information file can be multiplexed at any desired time.

Figure 16:
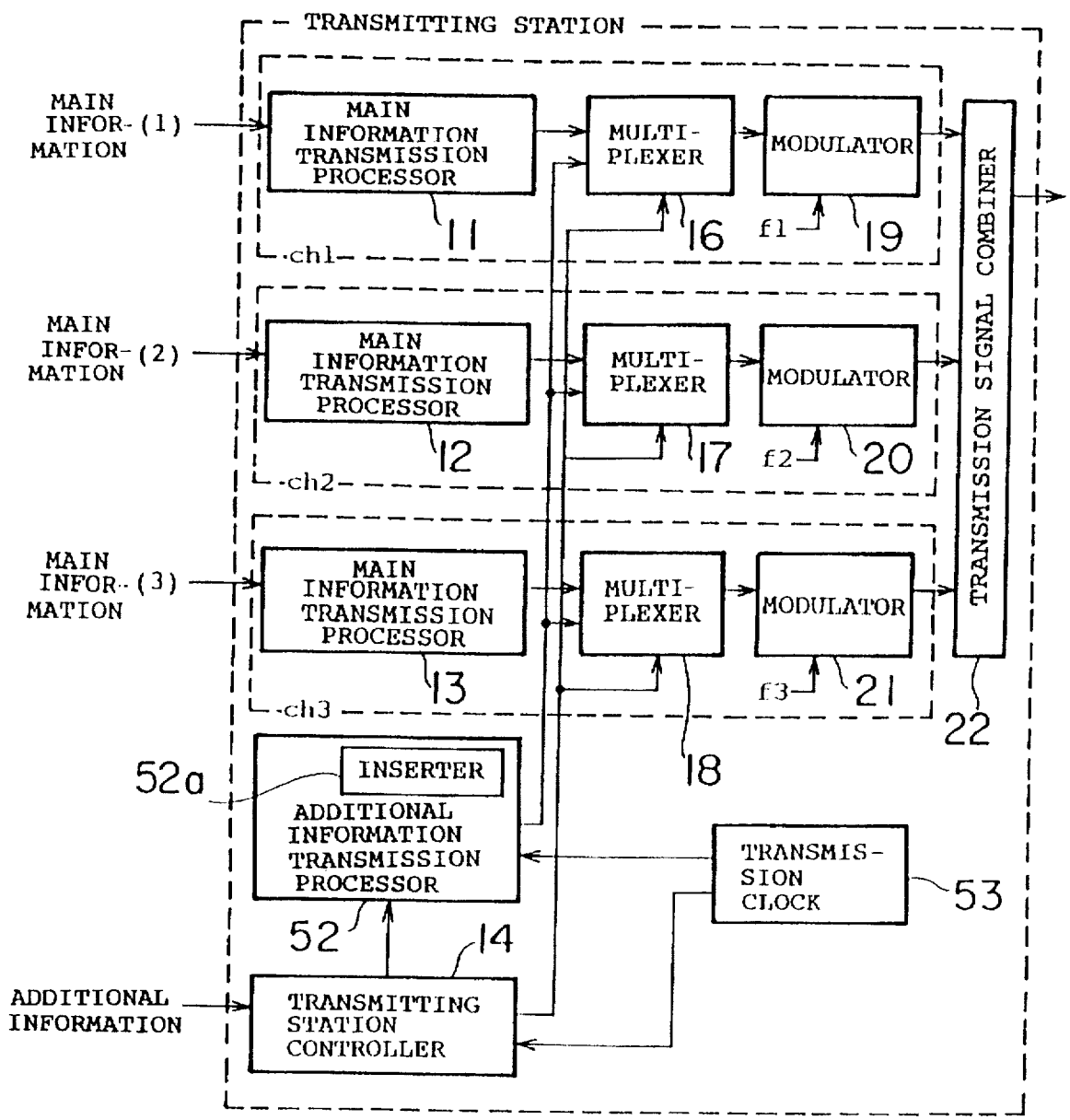
FIG. 16 is a block diagram of a transmitting station of a multichannel communication system according to a sixth embodiment of the present invention.

FIG. 16 shows in block form a transmitting station of a multichannel communication system according to a sixth embodiment of the present invention. The transmitting station shown in FIG. 16 is essentially similar to the transmitting station of the multichannel communication system according to the second embodiment. Therefore, those parts of the transmitting station shown in FIG. 16 which are identical to those of the transmitting station of the multichannel communication system according to the second embodiment are denoted by identical reference numerals, and will not be described in detail. Only those parts of transmitting station shown in FIG. 16 which are different from those of the transmitting station of the multichannel communication system according to the second embodiment will be described in detail below.

The transmitting station shown in FIG. 16 has an additional information transmission processor 52 in place of the additional information transmission processor 15 of the multichannel communication system according to the second embodiment, the additional information transmission processor 52 having an inserter 52a therein. The transmitting station shown in FIG. 16 also has a transmission clock 53 in place of the transmission clock 41 of the multichannel communication system according to the second embodiment. The additional information transmission processor 52 has the same function as that of the additional information transmission processor 15 of the multichannel communication system according to the second embodiment. In addition, the inserter 52a inserts time data indicative of a time at which to transmit additional information, into an additional information file. The transmission clock 53 starts measuring time based on the time data that has previously been inserted, and outputs a timing signal.

Figure 17:
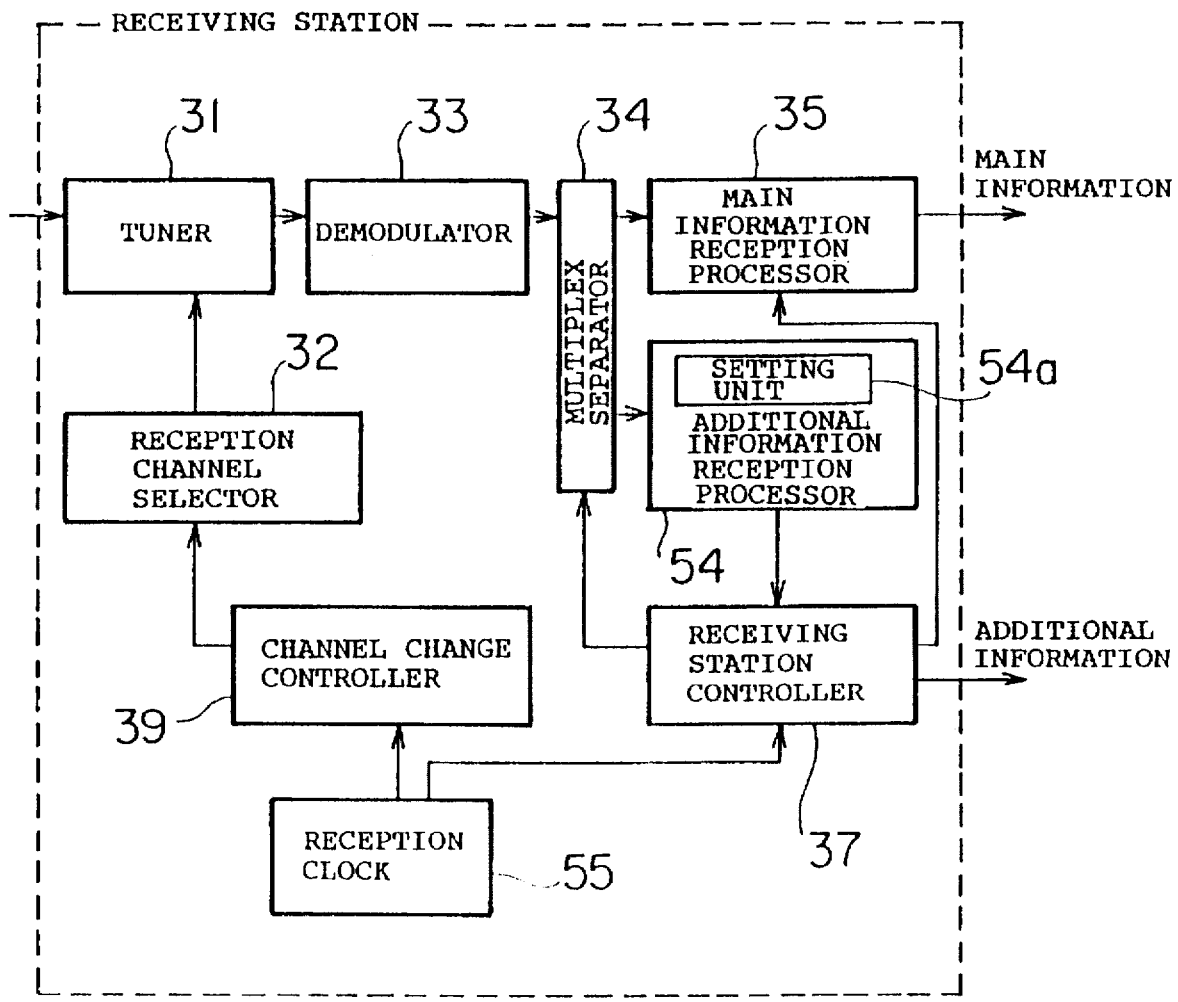
FIG. 17 is a block diagram of a receiving station of the multichannel communication system according to the sixth embodiment of the present invention.

FIG. 17 shows in block form a receiving station of the multichannel communication system according to the sixth embodiment of the present invention. The receiving station shown in FIG. 17 is essentially similar to the receiving station of the multichannel communication system according to the second embodiment. Therefore, those parts of the receiving station shown in FIG. 17 which are identical to those of the receiving station of the multichannel communication system according to the second embodiment are denoted by identical reference numerals, and will not be described in detail. Only those parts of receiving station shown in FIG. 17 which are different from those of the receiving station of the multichannel communication system according to the second embodiment will be described in detail below.

The receiving station shown in FIG. 17 has an additional information reception processor 54 in place of the additional information reception processor 36 of the multichannel communication system according to the second embodiment, the additional information reception processor 54 having a setting unit 54a therein. The receiving station shown in FIG. 17 also has a reception clock 55 in place of the reception clock 42 of the multichannel communication system according to the second embodiment. The additional information transmission processor 54 has the same function as that of the additional information reception processor 36 of the multichannel communication system according to the second embodiment. In addition, the setting unit 54a removes the time data inserted in the additional information, calculates times at which the OFF period of a next selection ON/OFF signal starts and ends based on the removed time data, and sends the calculated times and the removed data through the receiving station controller 37 to the reception clock 55. Based on the received time data, the reception clock 55 indicates when next additional information will be received to the receiving station controller 37, and also indicates when the OFF period of the next selection ON/OFF signal starts and ends to the channel change controller 39.

The other details of operation of the multichannel communication system according to the sixth embodiment are the same as those of the multichannel communication system according to the second embodiment, so that the multichannel communication system according to the sixth embodiment prevents additional information from being interrupted in reception, but reliably transmits additional information.

According to the sixth embodiment, as described above, the time to multiplex the additional information file is not fixed, but is set each time the additional information file is multiplexed. Therefore, the additional information file can be multiplexed at any desired time.

Figure 18:
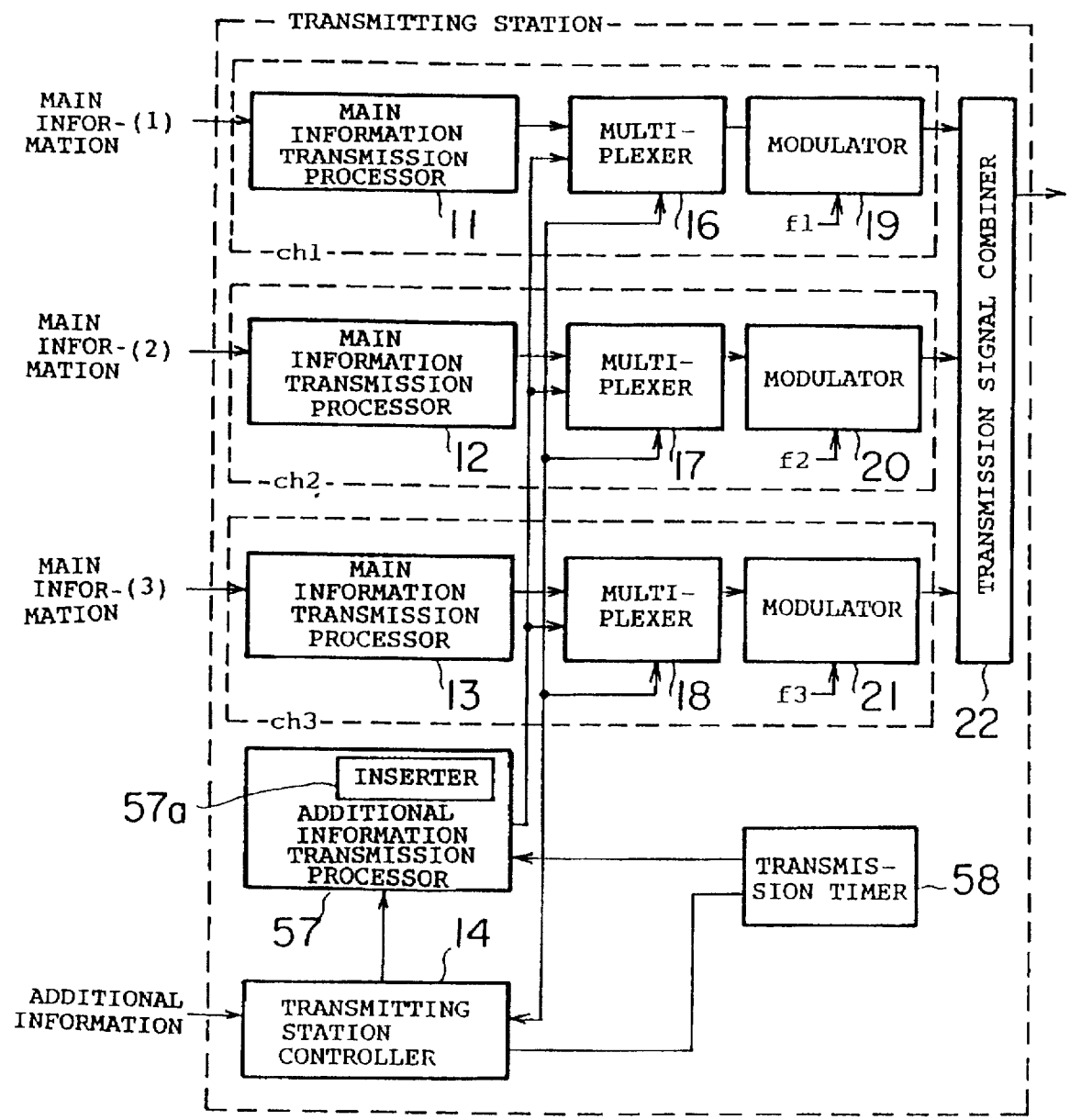
FIG. 18 is a block diagram of a transmitting station of a multichannel communication system according to a seventh embodiment of the present invention.

FIG. 18 shows in block form a transmitting station of a multichannel communication system according to a seventh embodiment of the present invention. The transmitting station shown in FIG. 18 is essentially similar to the transmitting station of the multichannel communication system according to the first embodiment. Therefore, those parts of the transmitting station shown in FIG. 18 which are identical to those of the transmitting station of the multichannel communication system according to the first embodiment are denoted by identical reference numerals, and will not be described in detail. Only those parts of transmitting station shown in FIG. 18 which are different from those of the transmitting station of the multichannel communication system according to the first embodiment will be described in detail below.

The transmitting station shown in FIG. 18 has an additional information transmission processor 57 in place of the additional information transmission processor 15 of the multichannel communication system according to the first embodiment, the additional information transmission processor 57 having an inserter 57a therein. The transmitting station shown in FIG. 18 also has a transmission timer 58 in place of the transmission timer 23 of the multichannel communication system according to the first embodiment. The additional information transmission processor 57 has the same function as that of the additional information transmission processor 15 of the multichannel communication system according to the first embodiment. In addition, the inserter 57a inserts period data indicative of periods at which to transmit additional information in next and following cycles, into an additional information file. The transmission timer 58 starts measuring time when the multiplexing of additional information is finished, measures the first period of time Ts based on the period data up to the previous cycle, and outputs a timing signal.

Figure 19:
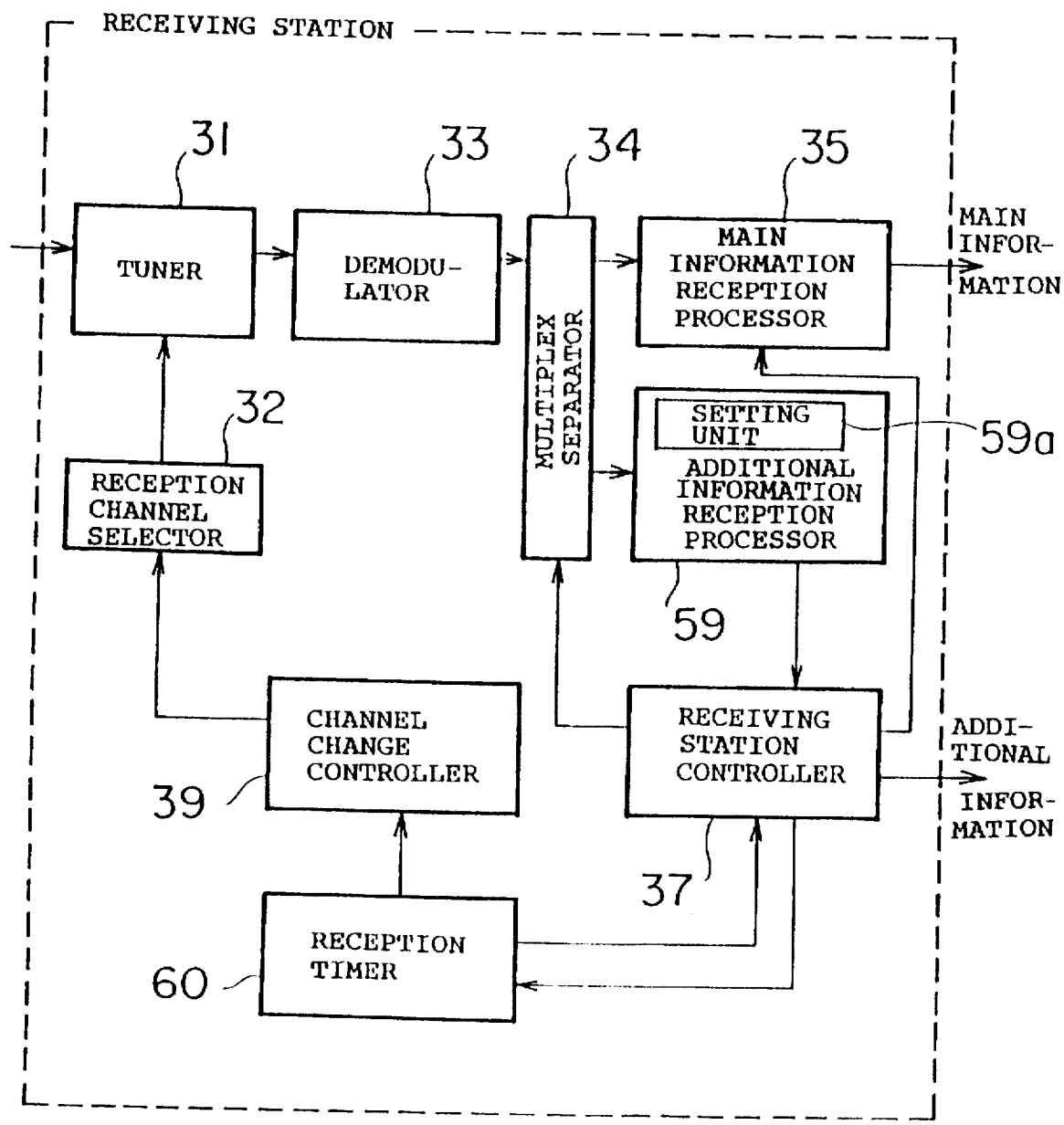
FIG. 19 is a block diagram of a receiving station of the multichannel communication system according to the seventh embodiment of the present invention.

FIG. 19 shows in block form a receiving station of the multichannel communication system according to the seventh embodiment of the present invention. The receiving station shown in FIG. 19 is essentially similar to the receiving station of the multichannel communication system according to the first embodiment. Therefore, those parts of the receiving station shown in FIG. 19 which are identical to those of the receiving station of the multichannel communication system according to the first embodiment are denoted by identical reference numerals, and will not be described in detail. Only those parts of receiving station shown in FIG. 19 which are different from those of the receiving station of the multichannel communication system according to the first embodiment will be described in detail below.

The receiving station shown in FIG. 19 has an additional information reception processor 59 in place of the additional information reception processor 36 of the multichannel communication system according to the first embodiment, the additional information reception processor 59 having a setting unit 59a therein. The receiving station shown in FIG. 19 also has a reception timer 60 in place of the reception timer 38 of the multichannel communication system according to the first embodiment. The additional information transmission processor 59 has the same function as that of the additional information reception processor 36 of the multichannel communication system according to the first embodiment. In addition, the setting unit 59a removes the period data inserted in the additional information, and sends the period data through the receiving station controller 37 to the reception timer 60 in which the period data is set as the first period of time Ts in the next and following cycles. The reception timer 60 starts measuring time at the time the reception of the additional information is finished, and, based on the first period of time Ts, the reception timer 60 indicates the time to receive next additional information in the next and following cycles to the receiving station controller 37 and also indicates the time when the OFF period of selection ON/OFF signals in the next and following cycles starts to the channel change controller 39.

The other details of operation of the multichannel communication system according to the seventh embodiment are the same as those of the multichannel communication system according to the first embodiment, so that the multichannel communication system according to the seventh embodiment prevents additional information from being interrupted in reception, but reliably transmits additional information.

According to the seventh embodiment, as described above, the period at which to multiplex the additional information file is normally fixed, but may be varied for flexibility.

Figure 20:
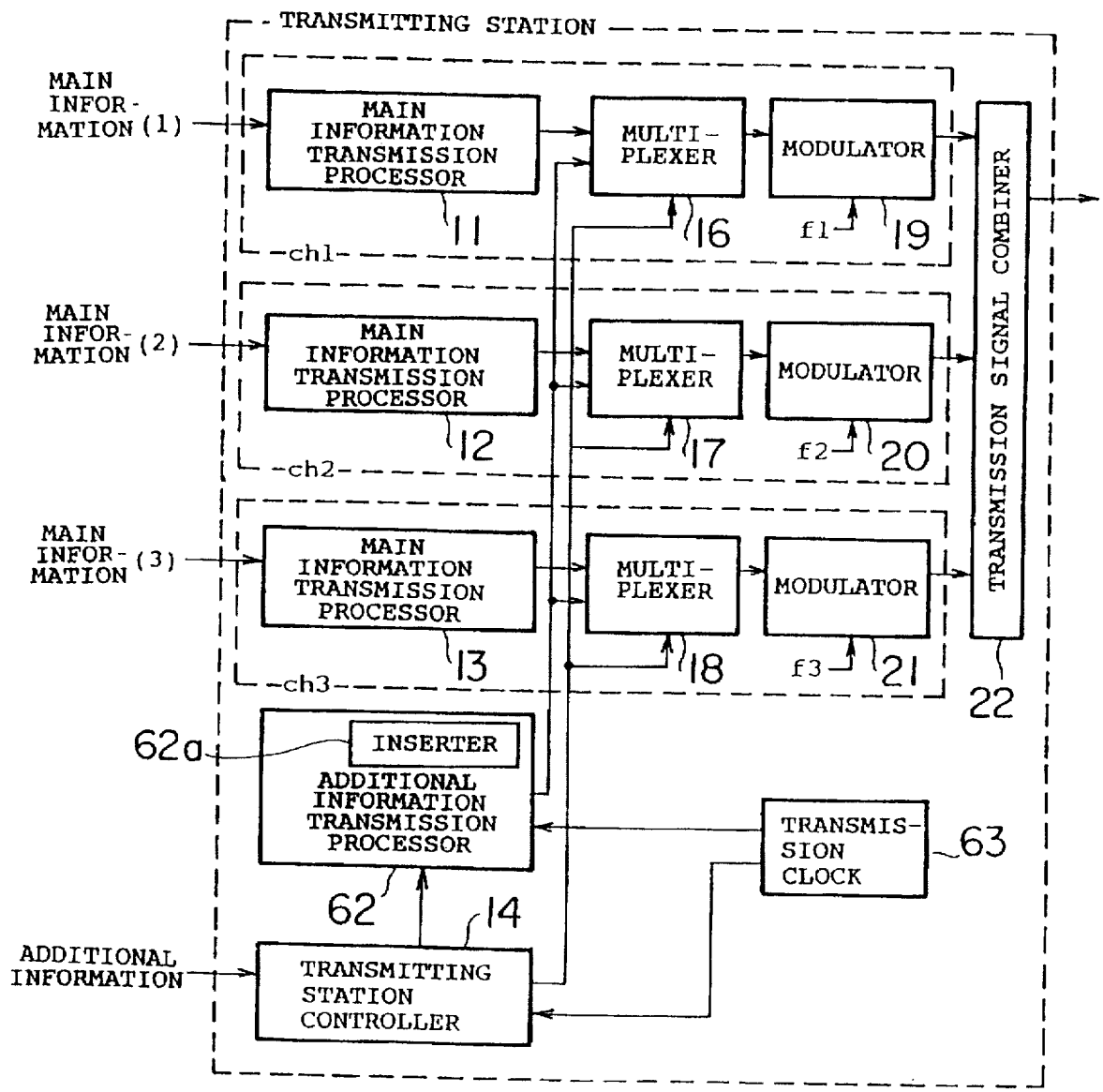
FIG. 20 is a block diagram of a transmitting station of a multichannel communication system according to an eighth embodiment of the present invention.

FIG. 20 shows in block form a transmitting station of a multichannel communication system according to an eighth embodiment of the present invention. The transmitting station shown in FIG. 20 is essentially similar to the transmitting station of the multichannel communication system according to the second embodiment. Therefore, those parts of the transmitting station shown in FIG. 20 which are identical to those of the transmitting station of the multichannel communication system according to the second embodiment are denoted by identical reference numerals, and will not be described in detail. Only those parts of transmitting station shown in FIG. 20 which are different from those of the transmitting station of the multichannel communication system according to the second embodiment will be described in detail below.

The transmitting station shown in FIG. 20 has an additional information transmission processor 62 in place of the additional information transmission processor 15 of the multichannel communication system according to the second embodiment, the additional information transmission processor 62 having an inserter 62a therein. The transmitting station shown in FIG. 20 also has a transmission clock 63 in place of the transmission clock 41 of the multichannel communication system according to the second embodiment. The additional information transmission processor 62 has the same function as that of the additional information transmission processor 15 of the multichannel communication system according to the second embodiment. In addition, the inserter 62a inserts time data indicative of times at which to transmit additional information in next and following cycles, into an additional information file. The transmission clock 63 starts measuring time based on the time data that has previously been inserted, and outputs a timing signal.

Figure 21:
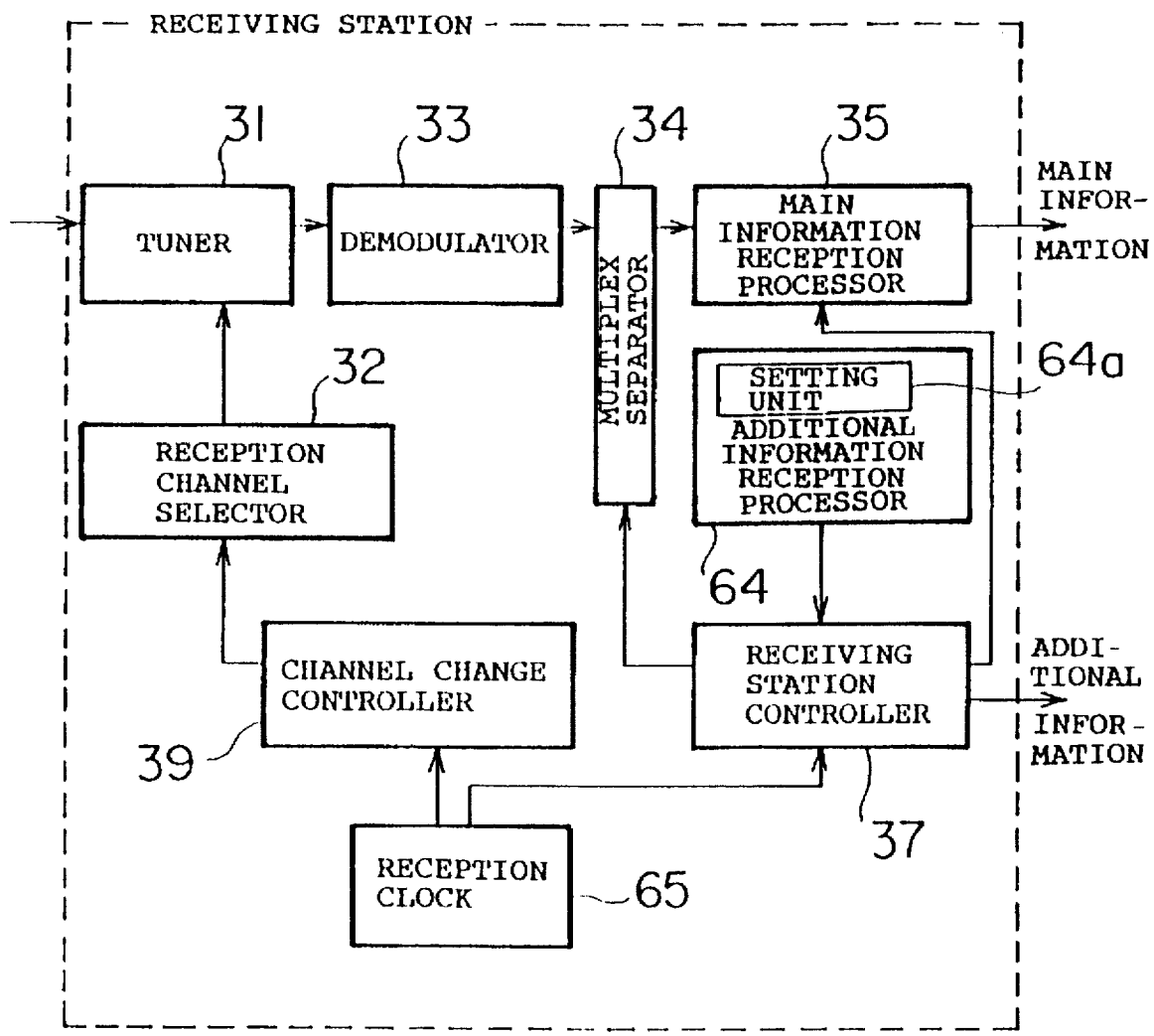
FIG. 21 is a block diagram of a receiving station of the multichannel communication system according to the eighth embodiment of the present invention.
Figure 22:
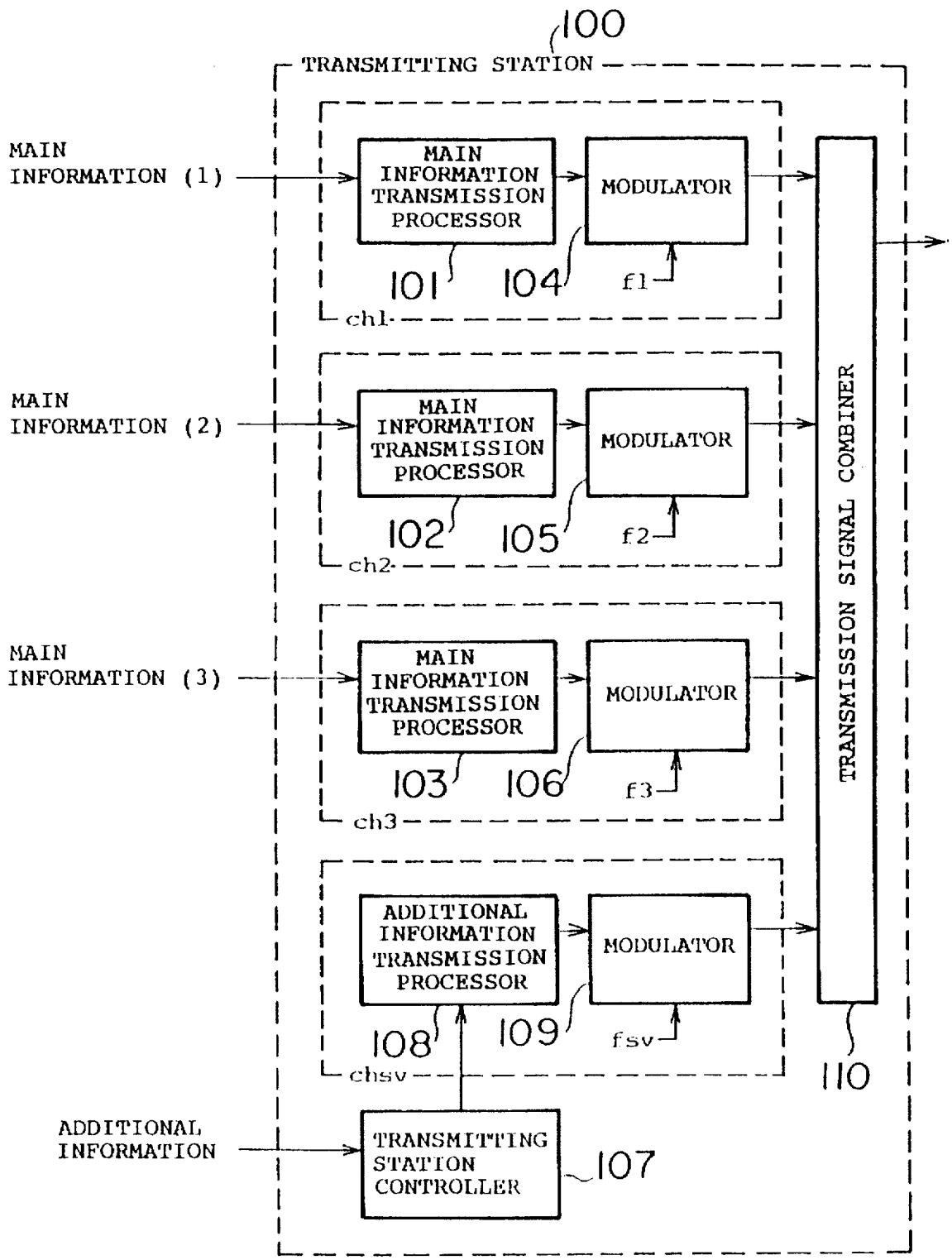
FIG. 22 is a block diagram of a transmitting station of a conventional multichannel communication or broadcasting system.
Figure 23:
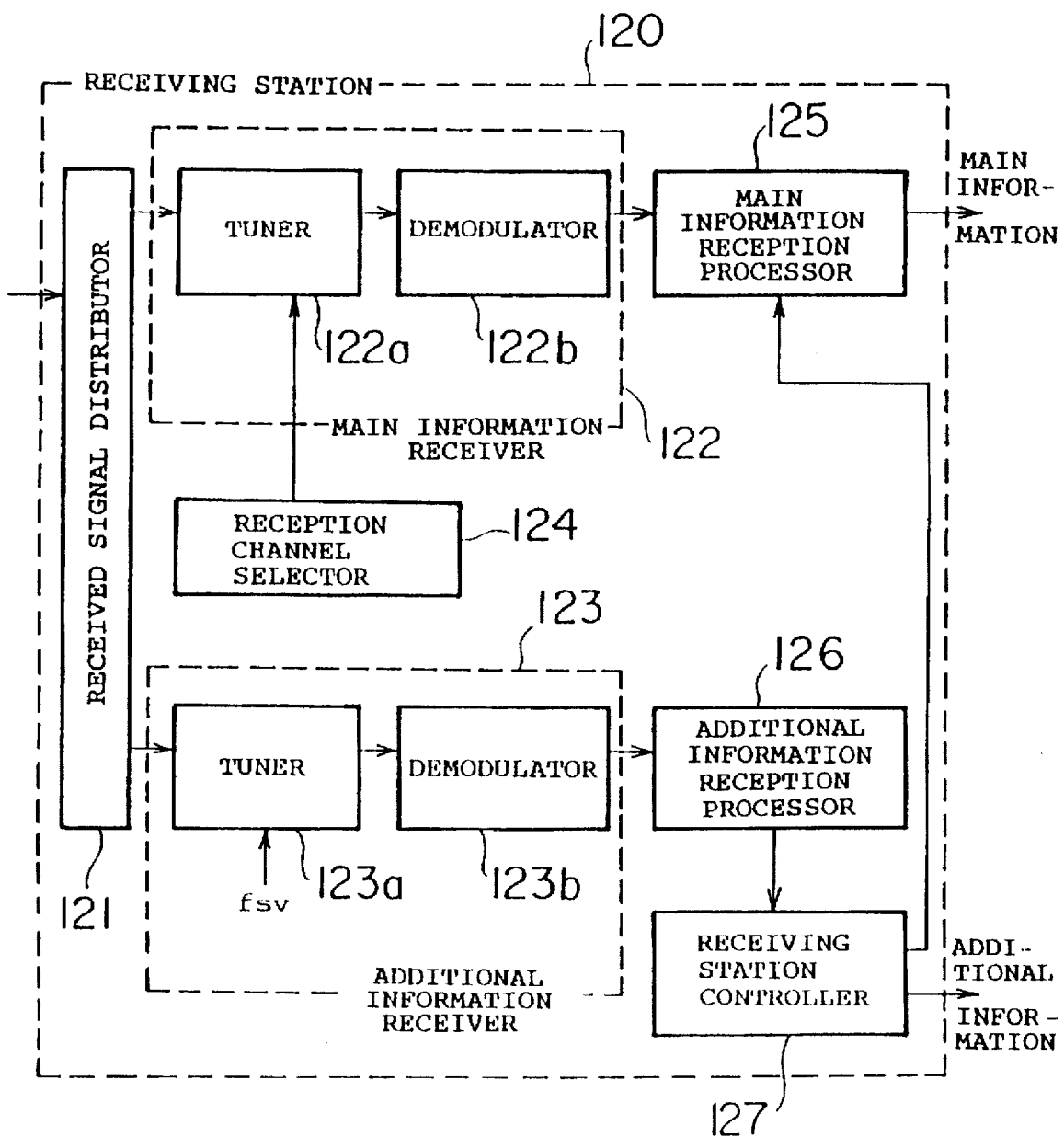
FIG. 23 is a block diagram of a receiving station of the conventional multichannel communication or broadcasting system.
Figure 24:
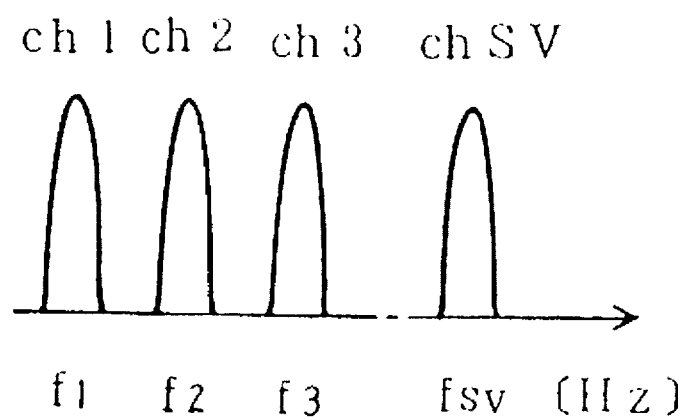
FIG. 24 is a diagram showing an arrangement of the of signals combined and transmitted by the frequencies conventional multichannel communication or broadcasting system.

FIG. 21 shows in block form a receiving station of the multichannel communication system according to the eighth embodiment of the present invention. The receiving station shown in FIG. 21 is essentially similar to the receiving station of the multichannel communication system according to the second embodiment. Therefore, those parts of the receiving station shown in FIG. 21 which are identical to those of the receiving station of the multichannel communication system according to the second embodiment are denoted by identical reference numerals, and will not be described in detail. Only those parts of receiving station shown in FIG. 21 which are different from those of the receiving station of the multichannel communication system according to the second embodiment will be described in detail below.

The receiving station shown in FIG. 21 has an additional information reception processor 64 in place of the additional information reception processor 36 of the multichannel communication system according to the second embodiment, the additional information reception processor 64 having a setting unit 65a therein. The receiving station shown in FIG. 21 also has a reception clock 65 in place of the reception clock 42 of the multichannel communication system according to the second embodiment. The additional information transmission processor 64 has the same function as that of the additional information reception processor 36 of the multichannel communication system according to the second embodiment. In addition, the setting unit 65a removes the time data inserted in the additional information, calculates times at which the OFF period of selection ON/OFF signals in the next and following cycles starts and ends based on the removed time data, rather than the time data thus far, and sends the calculated times and the removed data through the receiving station controller 37 to the reception clock 65. Based on the received time data, rather than the time data thus far, the reception clock 65 indicates when additional information in the next and following cycles will be received to the receiving station controller 37, and also indicates when the OFF period of the next selection ON/OFF signals in the next and following cycles starts and ends to the channel change controller 39.

The other details of operation of the multichannel communication system according to the eighth embodiment are the same as those of the multichannel communication system according to the second embodiment, so that the multichannel communication system according to the eighth embodiment prevents additional information from being interrupted in reception, but reliably transmits additional information.

According to the eighth embodiment, as described above, the times to multiplex the additional information files are predetermined, but may be varied altogether for flexibility.

In the above embodiments, the transmission timer and the transmission clock have been described as being implemented as individual components. However, they may be software-implemented by a control processor (not shown) in the transmitting station.

According to the present invention, as described above, the transmitter time-division-multiplexes and then frequency-division-multiplexes each main information in its channel with the same control information, and transmits the frequency-division-multiplexed signal. The receiver generates a channel change inhibit signal in timed relationship to the multiplexing of the control information, and if no channel change inhibit signal is generated when a channel change signal is received, the receiver extracts a signal in the channel indicated by the channel change signal from the frequency-division-multiplexed signal transmitted from the transmitter, and outputs the extracted signal. Therefore, insofar as the control information is received, channels are not changed, and the control information is prevented from being interrupted in reception and can reliably be transmitted. For such reliable transmission of the control information, no channel dedicated for transmitting the additional information is required, and the throughput of the additional information is not lowered by the transmission thereof in the same channels as the main information.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multichannel communication system comprising:

a transmitter for frequency-division-multiplexing signals in a plurality of channels and transmitting the frequency-division-multiplexed signals; and a receiver for selectively receiving a signal in one of the channels;

said transmitter comprising:

control information multiplexing means for time-division-multiplexing main information in each of the channels with control information common to the channels at the same timing; and transmitting means for frequency-division-multiplexing and transmitting the main information in each of the channels which has been time-division-multiplexed with the control information by said control information multiplexing means;

said receiver comprising:

inhibit signal generating means for generating a channel change inhibit signal in timed relationship to the multiplexing of said control information; and extracting means responsive to a channel change signal indicative of one of the channels to be received, for extracting the signal in said one of the channels which is indicated by said channel change signal from frequency-division-multiplexed signals transmitted from said transmitting means if a channel change inhibit signal is not transmitted from said inhibit signal generating means.

2. A multichannel communication system according to claim 1, wherein said inhibit signal generating means comprises means for generating a channel change inhibit signal in a period which contains at least a period in which said control information is received.

3. A multichannel communication system according to claim 1, wherein said inhibit signal generating means comprises means for generating a channel change inhibit signal in a period which is equal to the sum of a period in which said control information is received and a period of time required for said extracting means to change to the channel in which to extract the signal.

4. A multichannel communication system according to claim 1, wherein said extracting means comprises means for failing to change to said one of the channels which is indicated by said channel change signal from frequency-division-multiplexed signals transmitted from said transmitting means if a channel change inhibit signal is transmitted from said inhibit signal generating means when said channel change signal is received.

5. A multichannel communication system according to claim 1, wherein said control information multiplexing means comprises:

transmission clock means for measuring a predetermined period of time from the time when said main information is time-division-multiplexed with said control information, and outputting a timing signal; and means for time-division-multiplexing said main information with present control information based on the timing signal which is outputted by said transmission clock means based on previous control information.

6. A multichannel communication system according to claim 1, wherein said receiver further comprises:
  reception clock means for measuring a predetermined period of time from the time when previous control information is separated from the main information, and outputting a timing signal; and
  control information separating means for separating present control information from the signal extracted in the indicated channel by said extracting means, based on the timing signal outputted from said reception clock means.

7. A multichannel communication system according to claim 1, wherein said control information multiplexing means comprises:
  transmission clock means for measuring a predetermined period of time and outputting a timing signal; and
  means for time-division-multiplexing said main information with said control information based on the timing signal which is outputted by said transmission clock means.

8. A multichannel communication system according to claim 1, wherein said receiver further comprises:
  reception clock means for measuring a predetermined period of time and outputting a timing signal; and
  control information separating means for separating control information from the signal extracted in the indicated channel by said extracting means, based on the timing signal outputted from said reception clock means.

9. A multichannel communication system according to claim 1, wherein said extracting means comprises storing/extracting means responsive to said channel change signal, for storing the channel indicated by said channel change signal if a channel change inhibit signal is transmitted from said inhibit signal generating means, and extracting the signal in the stored channel from the frequency-division-multiplexed signals transmitted from said transmitting means immediately after the transmission of said channel change inhibit signal is ceased.

10. A multichannel communication system comprising:
  a transmitter for frequency-division-multiplexing signals in a plurality of channels and transmitting the frequency-division-multiplexed signals; and
  a receiver for selectively receiving a signal in one of the channels;
  said transmitter comprising:
    inserting means for inserting time interval data indicative of a time interval until next additional information is transmitted, into control information common to the channels;
    control information multiplexing means for time-division-multiplexing main information in each of the channels with the control information in which the time interval data has been inserted by said inserting means, based on previously inserted time interval data at the same timing; and
    transmitting means for frequency-division-multiplexing and transmitting the mail information in each of the channels which has been time-division-multiplexed with the control information by said control information multiplexing means;
  said receiver comprising:
    signal extracting means for extracting the signal in said one of the channels from frequency-division-multiplexed signals transmitted from said transmitting means;
    control information separating means for separating control information from the signal in said one of the channels which is extracted by said signal extracting means;
    inhibit signal generating means for generating a channel change inhibit signal based on time interval data inserted in previous control information separated by said control information separating means; and
    inhibit means for inhibiting said signal extracting means from extracting the signal in said one of the channels which is indicated by a channel change signal from the frequency-division-multiplexed signals transmitted from said transmitting means if a channel change inhibit signal is transmitted from said inhibit signal generating means when said signal extracting means receives said channel change signal.

11. A multichannel communication system comprising:
  a transmitter for frequency-division-multiplexing signals in a plurality of channels and transmitting the frequency-division-multiplexed signals; and
  a receiver for selectively receiving a signal in one of the channels;
  said transmitter comprising:
    inserting means for inserting time data indicative of a time at which to transmit next additional information, into control information common to the channels;
    control information multiplexing means for time-division-multiplexing main information in each of the channels with the control information in which the time data has been inserted by said inserting means, based on previously inserted time data at the same timing; and
    transmitting means for frequency-division-multiplexing and transmitting the main information in each of the channels which has been time-division-multiplexed with the control information by said control information multiplexing means;
  said receiver comprising:
    signal extracting means for extracting the signal in said one of the channels from frequency-division-multiplexed signals transmitted from said transmitting means;
    control information separating means for separating control information from the signal in said one of the channels which is extracted by said signal extracting means;
    inhibit signal generating means for generating a channel change inhibit signal based on previous time data inserted in previous control information separated by said control information separating means; and
    inhibit means for inhibiting said signal extracting means from extracting the signal in said one of the channels which is indicated by a channel change signal from the frequency-division-multiplexed signals transmitted from said transmitting means if a channel change inhibit signal is transmitted from said inhibit signal generating means when said signal extracting means receives said channel change signal.

12. A multichannel communication system comprising:
  a transmitter for frequency-division-multiplexing signals in a plurality of channels and transmitting the frequency-division-multiplexed signals; and
  a receiver for selectively receiving a signal in one of the channels;

said transmitter comprising:
inserting means for inserting period data indicative of a period at which to transmit additional information in next and following cycles, into control information common to the channels;
control information multiplexing means for time-division-multiplexing main information in each of the channels with the control information in which the period data has been inserted by said inserting means, based on period data thus far at the same timing; and
transmitting means for frequency-division-multiplexing and transmitting the mail information in each of the channels which has been time-division-multiplexed with the control information by said control information multiplexing means;

said receiver comprising:
signal extracting means for extracting the signal in said one of the channels from frequency-division-multiplexed signals transmitted from said transmitting means;
control information separating means for separating control information from the signal in said one of the channels which is extracted by said signal extracting means;
inhibit signal generating means for generating a channel change inhibit signal based on period data thus far inserted in control information separated by said control information separating means; and
inhibit means for inhibiting said signal extracting means from extracting the signal in said one of the channels which is indicated by a channel change signal from the frequency-division-multiplexed signals transmitted from said transmitting means if a channel change inhibit signal is transmitted from said inhibit signal generating means when said signal extracting means receives said channel change signal.

13. A multichannel communication system comprising:
a transmitter for frequency-division-multiplexing signals in a plurality of channels and transmitting the frequency-division-multiplexed signals; and a receiver for selectively receiving a signal in one of the channels;
said transmitter comprising:
inserting means for inserting time data indicative of a time at which to transmit additional information in next and following cycles, into control information common to the channels;
control information multiplexing means for time-division-multiplexing main information in each of the channels with the control information in which the time data has been inserted by said inserting means, based on time data thus far at the same timing; and
transmitting means for frequency-division-multiplexing and transmitting the mail information in each of the channels which has been time-division-multiplexed with the control information by said control information multiplexing means;

said receiver comprising:
signal extracting means for extracting the signal in said one of the channels from frequency-division-multiplexed signals transmitted from said transmitting means;
control information separating means for separating control information from the signal in said one of the channels which is extracted by said signal extracting means;
inhibit signal generating means for generating a channel change inhibit signal based on time data thus far inserted in control information separated by said control information separating means; and
inhibit means for inhibiting said signal extracting means from extracting the signal in said one of the channels which is indicated by a channel change signal from the frequency-division-multiplexed signals transmitted from said transmitting means if a channel change inhibit signal is transmitted from said inhibit signal generating means when said signal extracting means receives said channel change signal.

\* \* \* \* \*